US012420922B2

(12) United States Patent
Heironimus et al.

(10) Patent No.: US 12,420,922 B2
(45) Date of Patent: Sep. 23, 2025

(54) VERTICAL TAKE-OFF AND LANDING CRAFT SYSTEMS AND METHODS

(71) Applicant: SUPERNAL, LLC, Washington, DC (US)

(72) Inventors: William Kyle Heironimus, Dallas, TX (US); Brian Wang, San Diego, CA (US); Stephen Chung, Watauga, TX (US); Luis Gonzalez, Los Angeles, CA (US); Tony Li Jung Chen, Irvine, CA (US); Brett Gibson Morham, Manhattan Beach, CA (US)

(73) Assignee: Supernal, LLC, Washington, DC (US)

( * ) Notice: Subject to any disclaimer, the term of this patent is extended or adjusted under 35 U.S.C. 154(b) by 0 days.

(21) Appl. No.: 18/605,447

(22) Filed: Mar. 14, 2024

(65) Prior Publication Data
US 2024/0217656 A1    Jul. 4, 2024

Related U.S. Application Data

(63) Continuation-in-part of application No. 18/293,472, filed as application No. PCT/US2022/074357 on Jul. 29, 2022.

(Continued)

(51) Int. Cl.
*B64C 29/00* (2006.01)
*B64C 9/00* (2006.01)
*B64C 39/04* (2006.01)

(52) U.S. Cl.
CPC .......... *B64C 29/0033* (2013.01); *B64C 39/04* (2013.01); *B64C 9/00* (2013.01)

(58) Field of Classification Search
CPC ........................... B64C 29/0033; B64C 39/04
See application file for complete search history.

(56) References Cited

U.S. PATENT DOCUMENTS

| 4,979,698 A | 12/1990 | Lederman |
| 8,720,814 B2 | 5/2014 | Smith |
| (Continued) | | |

FOREIGN PATENT DOCUMENTS

| CN | 108382590 A | 8/2018 |
| EP | 3 670 341 A1 | 6/2020 |
| (Continued) | | |

OTHER PUBLICATIONS

International Search Report and Written Opinion for Int. App. No. PCT/US2022/074357, mailed Jan. 4, 2023.

*Primary Examiner* — Timothy D Collins
*Assistant Examiner* — Eric Acosta
(74) *Attorney, Agent, or Firm* — McDonnell Boehnen Hulbert & Berghoff LLP

(57) ABSTRACT

A craft capable of a vertical take-off and landing configuration and a horizontal thrust configuration may include, for example, at least a proprotor, an edgewise blade, and a body. The proprotor may be configured to tilt to achieve a horizontal thrust component. A portion of a lift surface may be configured to tilt with the proprotor. In some embodiments, the vertical take-off and/or landing craft may further comprise a tail connected to a first boom and a second boom. In some embodiments, the vertical take-off and/or landing craft may further comprise a tail attached to the body. In some embodiments, the craft includes four rotors positioned on the lift surface and two rotors positioned on a tail connected to the lift surface.

16 Claims, 25 Drawing Sheets

Related U.S. Application Data

(60) Provisional application No. 63/333,966, filed on Apr. 22, 2022, provisional application No. 63/203,822, filed on Jul. 31, 2021.

(56) References Cited

U.S. PATENT DOCUMENTS

| | | |
|---|---|---|
| 9,284,058 B2 | 3/2016 | Wang |
| 9,694,911 B2 | 7/2017 | Bevirt et al. |
| 10,046,855 B2 | 8/2018 | Bevirt et al. |
| 10,259,577 B2 | 4/2019 | Taylor et al. |
| 10,351,235 B2 | 7/2019 | Karem et al. |
| 10,526,083 B2 | 1/2020 | Shaw |
| 10,556,679 B2 | 2/2020 | Petrov |
| 10,625,852 B2 | 4/2020 | Bevirt et al. |
| 10,717,522 B2 | 7/2020 | Taylor et al. |
| 10,737,797 B2 | 8/2020 | Murrow et al. |
| 10,926,654 B1 | 2/2021 | Thrun et al. |
| 10,974,826 B2 | 4/2021 | Karem et al. |
| 10,974,827 B2 | 4/2021 | Bevirt et al. |
| 10,988,249 B1 | 4/2021 | Sinha et al. |
| 11,001,374 B2 | 5/2021 | Kawiecki |
| 11,066,159 B2 | 7/2021 | Karem et al. |
| 11,066,162 B2 | 7/2021 | Sinha et al. |
| 11,077,937 B1 | 8/2021 | Bruell et al. |
| 11,180,248 B2 | 11/2021 | Vander Lind et al. |
| 11,203,423 B2 | 12/2021 | Karem et al. |
| 11,208,203 B2 | 12/2021 | Parks et al. |
| 11,273,911 B2 | 3/2022 | Brand et al. |
| 11,299,287 B1 | 4/2022 | Moy et al. |
| 11,312,491 B2 | 4/2022 | Morris et al. |
| 11,320,841 B2 | 5/2022 | McCullough et al. |
| 11,353,890 B1 | 6/2022 | Auerbach et al. |
| 11,407,510 B2 | 8/2022 | Mikic et al. |
| 11,492,116 B2 | 11/2022 | Campbell |
| 11,492,131 B2 | 11/2022 | Ross et al. |
| 11,661,180 B2 | 5/2023 | Bower et al. |
| 11,691,724 B2 | 7/2023 | DePape et al. |
| 11,693,429 B2 | 7/2023 | Mores et al. |
| 11,745,883 B2 | 9/2023 | Melack |
| 11,787,535 B2 | 10/2023 | Mahboubi et al. |
| 11,866,186 B2 | 1/2024 | Bevirt et al. |
| 11,905,008 B2 | 2/2024 | Rosen |
| 2018/0079493 A1 | 3/2018 | Anderson et al. |
| 2020/0070968 A1 | 3/2020 | Prager et al. |
| 2020/0108919 A1 | 4/2020 | Sada et al. |
| 2020/0231277 A1 | 7/2020 | Moore |
| 2020/0331602 A1 | 10/2020 | Mikic et al. |
| 2020/0391862 A1* | 12/2020 | Groninga ............ B64C 29/0033 |
| 2021/0064062 A1 | 3/2021 | Katayama et al. |
| 2021/0253237 A1 | 8/2021 | Bevirt et al. |
| 2021/0300194 A1 | 9/2021 | Thrun et al. |
| 2021/0300541 A1 | 9/2021 | Sinha et al. |
| 2021/0331793 A1 | 10/2021 | Groninga et al. |
| 2021/0347472 A1 | 11/2021 | Karem et al. |
| 2021/0347473 A1 | 11/2021 | Dietrich et al. |
| 2021/0362852 A1 | 11/2021 | McCullough et al. |
| 2021/0362857 A1 | 11/2021 | McCullough et al. |
| 2021/0403154 A1 | 12/2021 | Tighe et al. |
| 2022/0009626 A1 | 1/2022 | Baharav et al. |
| 2022/0089279 A1 | 3/2022 | Rosen |
| 2022/0126996 A1 | 4/2022 | Long |
| 2022/0135217 A1 | 5/2022 | Wittmaak, Jr. et al. |
| 2022/0169375 A1 | 6/2022 | Ouellet et al. |
| 2022/0177124 A1 | 6/2022 | Marshall et al. |
| 2022/0177145 A1 | 6/2022 | Melack |
| 2022/0250742 A1 | 8/2022 | Bower |
| 2022/0306292 A1 | 9/2022 | Ross et al. |
| 2022/0371727 A1 | 11/2022 | Ross et al. |
| 2023/0048620 A1 | 2/2023 | Bevirt et al. |
| 2023/0103521 A1 | 4/2023 | Bower et al. |

FOREIGN PATENT DOCUMENTS

| | | |
|---|---|---|
| WO | 2019/217920 A1 | 11/2019 |
| WO | 2020/105045 A1 | 5/2020 |
| WO | 2020/250029 A1 | 12/2020 |
| WO | 2021/140804 A1 | 7/2021 |
| WO | 2021/236576 A1 | 11/2021 |
| WO | 2022/074405 A1 | 4/2022 |
| WO | 2022/170356 A1 | 8/2022 |

* cited by examiner

VERTICAL TAKE-OFF AND LANDING CRAFT SYSTEMS AND METHODS

CROSS REFERENCE TO RELATED APPLICATIONS

The present application is a continuation-in-part of U.S. patent application Ser. No. 18/293,472, filed Jan. 30, 2024 which is a U.S. National Phase Application pursuant to 35 U.S.C. § 371 of International Application No. PCT/US2022/074357 filed Jul. 29, 2022, which claims priority to U.S. Provisional Patent Application No. 63/203,822 filed Jul. 31, 2021 and U.S. Provisional Patent Application No. 63/333,966 filed Apr. 22, 2022. The entire disclosure contents of these applications are herewith incorporated by reference into the present application.

FIELD

The presently disclosed subject matter generally relates to a vertical take-off and/or landing craft configured to operate in a vertical take-off and landing configuration and a horizontal thrust configuration.

BACKGROUND

A variety of aircraft are currently known, falling into general categories of horizontal thrust aircraft (e.g., fixed wing aircraft) and vertical thrust aircraft (e.g., helicopters). The benefits of horizontal thrust aircraft are speed and efficient structures to transfer thrust to generate lift under wings. However, horizontal thrust aircraft suffer certain drawbacks, such as requiring specific landing areas, such as runways, to generate or deplete speed during take-off and landing. Vertical thrust aircraft have the benefit of being able to quickly gain lift without horizontal movement, and thus can take off from and land in relatively small areas (e.g., helipads). However, vertical thrust aircraft also suffer from certain drawbacks, such as the inability to carry large loads or travel horizontally at significant speed over longer distances.

There have been numerous attempts to create vertical take-off and landing ("VTOL") craft, which combine the capability of taking off and landing from various locations that do not have significant landing areas while also providing general thrust capability when the aircraft is flying. As an example, some VTOL craft include separate thrust generators, one that is designed to create vertical thrust while the aircraft is taking off or landing, and one that generates horizontal thrust while the craft is airborne and flying horizontally. However, these craft suffer from numerous deficiencies, including inefficient use of fuel and structure as well as distance and airspeed limitations. Moreover, the currently available structures necessary to support the vertical thrust motors are heavy and expensive, presenting obstacles to scalability.

Other attempts at VTOL craft, such as drones, include quadrotors (e.g., at least four vertical thrust rotors). While these craft, like helicopters, can efficiently create vertical lift, they are known to have poor horizontal thrust capability and are not suitably scalable to move persons or goods. These craft also suffer from requiring all vertical thrust rotors to continuously operate, as the craft would become unbalanced should one of the vertical thrust rotors become inactive or disabled. Such an unbalanced condition often results in loss of roll, pitch, or yaw control, which may lead to craft control failure. Such losses are not sustainable when considering transportation of goods and people, particularly in crowded metropolitan areas.

Thus, there is an increasing need for efficient, scalable, safe, easily manufactured, and economically feasible vertical take-off and landing craft that are suited to efficiently generate horizontal thrust capability at speed, as well as to take off and land with minimal infrastructure requirements. There is demand for such craft (whether it be autonomous, piloted, or a combination of both) capable of traveling a variety of distances for a variety of applications, including but not limited to package delivery, photography, and shuttling/taxiing individuals or goods. The drawbacks of existing craft, as discussed above, render them incapable of meeting these demands for a variety of reasons, including because they lack sufficient horizontal thrust capability, require heavy structures, have a reduced capability to carry loads commensurate with transporting goods or persons.

SUMMARY

Briefly described, embodiments of the presently disclosed subject matter relate to systems and methods for a vertical take-off and/or landing craft.

An exemplary aspect of this disclosure relates to a craft comprising a body, a lift surface attached to the body, the lift surface comprising a first partial lift surface positioned at a first end and a second partial lift surface positioned at a second end, wherein first partial lift surface and second partial lift surface are configured to rotate, the first partial lift surface comprising a first proprotor, wherein the first proprotor is configured to rotate with the first partial lift surface, the second partial lift surface comprising a second proprotor, wherein the second proprotor is configured to rotate with the second partial lift surface, a first boom positioned between the body and the first proprotor and attached to the lift surface, and a second boom positioned between the body and the second proprotor and attached to the lift surface, wherein the first boom and the second boom are connected via a tail aft of the body.

In some embodiments, at least a portion of the tail may be positioned above the lift surface when the craft is in a rest position. In some embodiments, the tail may extend upward from the body and connects above the body. In some embodiments, the tail may include a Bronco tail. In some embodiments, the first boom and the second boom may each comprise at least one edgewise blade. In some embodiments, at least one control surface may be positioned at least partially above a rotation plane of the edgewise blades. In some embodiments, at least one of the first partial lift surface and the second partial lift surface is configured to rotate around an axis substantially parallel to the lift surface. In some embodiments, at least one of the first partial lift surface and the second partial lift surface comprises a winglet. In some embodiments, at least one of the first partial lift surface and the second partial lift surface may comprise a wing surface. In some embodiments, the first and second partial lift surfaces may each extend outboard from the proprotors, and wherein the first and second partial lift surfaces are configured to resist a gyroscopic effect caused by the rotation of the proprotors in a vertical take-off and landing configuration. In some embodiments, at least one of the first boom and the second boom may comprise an electric battery. In some embodiments, the battery can be used to power a motor.

An exemplary aspect of this disclosure relates to a craft comprising a body, a lift surface attached to the body, a first proprotor and a first hub, wherein the first hub is attached to a first end of lift surface and configured to rotate about an axis substantially parallel to the lift surface, a second proprotor and a second hub, wherein the second hub is attached to a second end of lift surface and configured to rotate about an axis substantially parallel to the lift surface, a first boom positioned between the body and the first end, the first boom comprising at least one rotor, a second boom positioned between the body and the second end, the second boom comprising at least one rotor; and a tail attached to and extending aft of the body.

In some embodiments, the tail may include a V-tail portion having at least two surfaces extending upwards aft of the body. In some embodiments, the first boom and the second boom each comprise at least two rotors. In some embodiments, the lift surface includes a first partial lift surface positioned at the first end and a second partial lift surface positioned at the second end, wherein the first partial lift surface is configured to rotate with said first hub and the second partial lift surface is configured to rotate with said second hub. In some embodiments, at least one of the first partial lift surface and the second partial lift surface comprises a wing portion. In some embodiments, at least one of the first partial lift surface and the second partial lift surface comprises a winglet. In some embodiments, the first and second partial lift surfaces each extend outboard from the first hub and the second hub, respectively, and wherein the first and second partial lift surfaces are configured to resist a gyroscopic effect caused by the rotation of the proprotors in a vertical take-off and landing configuration. In some embodiments, the first boom and second boom may comprise an electric battery. In some embodiments, the electric battery may be used to power a motor. In some embodiments, at least one control surface may be positioned at least partially above a rotation plane of the rotors.

An exemplary aspect of this disclosure relates to vertical take-off and/or landing craft. The vertical take-off and/or landing craft may comprise a body, a proprotor, and an edgewise blade. The proprotor may include a blade configured to operate in a vertical take-off configuration and in a cruise configuration. The proprotor in the vertical take-off configuration may be oriented so that thrust is directed substantially towards a ground surface. The proprotor may be configured to tilt or rotate to achieve a horizontal thrust component. The proprotor may be configured to be controlled through a collective control system and/or through a cyclic control system. The proprotor in the cruise configuration may be oriented so that thrust is directed substantially perpendicular to the ground surface. The edgewise blade or rotor may be configured to generate thrust in a direction substantially towards a ground surface. The edgewise blade or rotor may be attached to a boom. The edgewise blade or rotor may have a fixed pitch and/or operate at a fixed rotations per minute ("rpm"). The boom may include a battery pack configured to supply electric power to one or more thrust motors. The thrust motor may be configured to supply mechanical energy to one or more of the proprotor and the edgewise blade. In some embodiments, one or more thrust motors may be connected to each proprotor and each edgewise blade.

In some embodiments, the vertical take-off and/or landing craft comprises a bronco tail. The bronco tail can be a tail that extends from both a first boom and a second boom, wherein the tail connects above the first boom and the second boom. The bronco tail can comprise an elevator on a relatively horizontal portion of the tail that is above the first boom and the second boom. The bronco tail can comprise a control surface on each relatively upright portion of the tail.

In some embodiments, the vertical take-off and/or landing craft comprises a bronco tail. The bronco tail can be a tail that extends from both a first boom and a second boom, wherein the tail connects above the first boom and the second boom. The bronco tail can comprise an elevator on a relatively horizontal portion of the tail that is above the first boom and the second boom. The bronco tail can comprise a control surface on each relatively upright portion of the tail.

In some embodiments, the proprotor may include a first proprotor and a second proprotor. The first proprotor may be attached to a first end of a lift surface, and the second proprotor may be attached to a second end of the lift surface. The ends of the lift surface can comprise winglets. The winglets may extend upward relative to the wing from a connection with a proprotor hub. In some embodiments, the lift surface may be coupled to the body. In some embodiments, the edgewise blade or rotor may include a first edgewise blade, second edgewise blade, third edgewise blade, and fourth edgewise blade. In some embodiments, the first and second edgewise blades may be attached to a first boom, wherein the first edgewise blade or rotor is positioned forward of the lift surface and the second edgewise blade or rotor is positioned aft of the lift surface. In some embodiments, the third and fourth edgewise blades may be attached to a second boom, wherein the third edgewise blade or rotor is positioned forward of the lift surface and the fourth edgewise blade or rotor is positioned aft of the lift surface. In some embodiments, the first boom may be positioned laterally along the lift surface on a first side of the body and the second boom may be positioned laterally along the lift surface on a second side of the body.

The foregoing summarizes only a few aspects of the presently disclosed subject matter and is not intended to reflect the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

Figure 1:
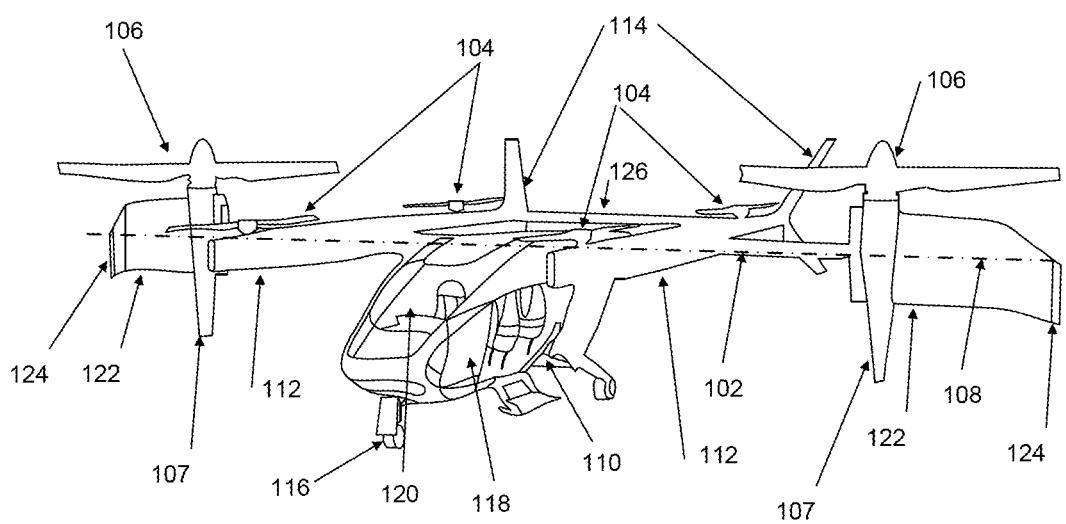
FIG. 1 illustrates a craft according to some embodiments of the present disclosure.

It is to be understood that both the foregoing general description and the following detailed description are exemplary and explanatory only and are not restrictive of the scope of the invention.

DETAILED DESCRIPTION

Reference will now be made in detail to exemplary embodiments, some examples of which are shown in the accompanying drawings.

To facilitate an understanding of the principles and features of the invention, various illustrative embodiments are explained below. In particular, the presently disclosed subject matter is described in the context of systems and methods for the operation of a vertical take-off and/or landing craft.

Improved craft, consistent with each of the various disclosed embodiments, may include proprotors configured to rotate from one position when the craft is in a vertical thrust configuration to another position when the craft is in a horizontal thrust configuration, thereby allowing the aircraft to both land in small clearances and efficiently and quickly travel horizontally.

Improved craft, consistent with each of the various disclosed embodiments, may include one or more vertical lift rotors to provide vertical lift capability, and to ensure that the craft has multiple lift systems should one or more rotors become inactive or disabled. For example, if one or more of the vertical lift rotors and/or proprotors becomes inactive or disabled, exemplary craft may be configured to land using vertical thrust from other systems. As another example, if one or more lift rotors becomes inactive or disabled, proprotors may also be configured to land the aircraft either in a vertical thrust configuration or in a horizontal thrust configuration (e.g., landing at speed on a runway).

Improved craft, consistent with each of the various disclosed embodiments, may include one or more rotatable rotors to provide vertical and horizontal lift capability, and to ensure that the craft has multiple lift systems should one or more rotors become inactive or disabled. Further, improved craft, consistent with each of the various disclosed embodiments, may include at least six rotors positioned on the lift surface and/or the horizontal tail, to improve issues with edgewise flow, to decrease noise within the passenger cabin, to remove the rotors from ground effect, and to improve controllability of the rotors.

Improved craft, consistent with each of the disclosed embodiments, may also incorporate a variety of tail configurations. As a person of ordinary skill in the art will understand, various tail configurations may be desirable for various craft depending on the goals of the manufacturers, operators, and end-users. For example, certain tail configurations are desirable to reduce weight, reduce components, reduce interaction between rotors, stabilizers, and/or lift surfaces, reduce the tail area, improve the aesthetic look of an aircraft, provide ground clearance during take-off and/or landing, improve hub spacing to avoid potential blade strike, include an empennage shape to avoid blocking air to an elevator, and/or allow for a continuous structural wing box. Moreover, it is known that aircraft structure, including certain tail configurations, can be improved by streamlining the aircraft structure necessary to support heavy components such as proprotors, electric motors, and batteries. It is contemplated that the various embodiments disclosed herein may use any of the tail configurations disclosed herein, and to the extent a specific tail configuration is discussed with respect to a particular embodiment, that tail configuration is provided for illustrative purposes and is not intended to be limiting.

FIGS. 1-23 illustrate non-limiting exemplary embodiments of craft consistent with the present disclosure. It should be understood that the examples and embodiments described herein are exemplary and non-limiting, and represent simplified descriptions used to facilitate understanding of the principles and methods of this disclosure.

FIG. 1 illustrates a craft 100 in a vertical take-off and landing configuration according to some embodiments of the present disclosure. As shown in FIG. 1, craft 100 may include, among other things, a body 110, one or more edgewise blades or rotors 104, one or more proprotors 106 which may be mounted on respective hubs 107, one or more booms 112, one or more lift surface 102, and a tail 114. Craft 100 may be manned or unmanned. It is envisioned that craft 100 may be used for any purpose known to those skilled in the art, including for example, as a taxi, a delivery vehicle, a personal vehicle, a cargo transport, a short or long-distance hauling aircraft, and/or a video/photography craft.

Body 110 may be any suitable shape, size, or configuration suitable for the purpose of the craft, as will be understood by a person of ordinary skill in the art. For example, body 110 may be oval, square, triangular, or otherwise any appropriate shape sufficient to hold cargo and/or passengers while remaining structurally sound. Moreover, body 110 may include gear 116 for landing on land and/or water, which may or may not be retractable. The gear 116 may be included at both the front and the back of the craft, and may include wheels, treads, pontoons, or other components that may aid the craft in landing in land and/or water. Body 110 may also include a cockpit 118 configured to hold a pilot, passenger(s), and/or cargo. In one example, the pilot may be located at the front of the aircraft and the passengers and/or cargo may be located behind the pilot. However, it is contemplated that the pilot could be located at any location within the body (or that the craft could be maneuvered without a pilot at least some of the time). Body 110 may also include a windshield 120 of any suitable shape and size; one or more doors configured to open and/or close (e.g., by swinging, sliding, and/or raising/lowering) to allow ingress/egress of persons and/or cargo; one or more seats; and controls and/or a computer system configured to communicate and/or control craft systems for the craft, including for example, proprotors 106, edgewise blades or rotors 104, and/or one or more control surfaces (e.g., elevator, rudder, ruddervator, actuator, spoiler, or other known controls/surfaces). Body 110 may include a fuselage configured to provide structure to connect and/or link a lift surface structure of lift surface 102. In some embodiments, the fuselage may be of truss, monocoque, or semi-monocoque construction. The fuselage may be constructed of aluminum of carbon fiber.

Proprotors 106 and/or edgewise blades or rotors 104 may be positioned above or away from control surfaces and/or portions of body 110 such that a blade strike is unlikely or not possible. For example, proprotors 106 may be spaced above a proprotor hub 107 and/or edgewise blades or rotors 104, when in a vertical take-off and landing configuration, proprotors 106 may be spaced along lift surface 102 and substantially above body 110, and/or edgewise blades or rotors 104 may be spaced along booms 112 and substantially above body 110. Proprotors 106 may be spaced along lift surface 102 away from tail 114 (e.g., outboard) to avoid a blade strike on tail 114. For example, each proprotor 106 may be positioned at more than half the distance of one wing from body 110 or, in some embodiments, more than two-thirds the distance of one wing from body 110.

Proprotors, edgewise blades or rotors 104, and/or controls may be operable by an onboard pilot, an onboard computer (e.g., autonomously), or from a control outside of the craft (e.g., remotely), or a mixture of one or more of an onboard pilot, an onboard computer, and/or a control outside of the aircraft. A proprotor may be configured to be controlled through a power control (e.g., throttle), a pitch control (e.g., collective) and/or an angle of attack control (e.g., cyclically), or any suitable combination of these controls. Each of these controls may comprise mechanical and electrical actuators, switches, or other controls known to one of ordinary skill in the art, in conjunction with one or more processors (e.g., within controllers, computers) to effect operation and management of each individual control or as a subset of controls or all controls altogether.

Lift surface 102 may extend relatively horizontally, when the craft is at rest, from one end to another. Lift surface 102 may include an airfoil configured to generate lift when air flows past it. Lift surface 102 may be a single continuous surface, or may include sections of lift surfaces, for example with one or more sections arranged inboard (e.g., towards body 110) of booms 112 (discussed below) and one or more sections arranged outboard (e.g., away from body 110) of booms 112. Lift surface 102 may incorporate portions of, or include shaped portions of, body 110, booms 112, and/or proprotors 106 to generate lift and/or reduce drag as air flows past.

Booms 112 may efficiently provide structure for tail structure 114, one or more electric motors for one or more edgewise blades or rotors 104, and/or one or more batteries to power one or more edgewise blades or rotors 104 and/or one or more proprotors 106. The edgewise blades or rotors may also be connected to the craft's electrical and control systems. Booms 104 may be supported by lift surface 102 and the internal structure of the lift surface. Thus, the structure of lift surface 102 may efficiently provide lift to craft 100 to carry persons or cargo while incorporating structure to support booms 104, and/or additionally to support proprotors 106 in horizontal thrust and vertical take-off and landing configurations. Additionally, proprotors 106 can create stress on structure as it rotates, and it is thus advantageous to support proprotors 106 through the lift surface 102 that comprises internal structural components, such as spars and ribs, that are capable of withstanding the stress from proprotors 106 as they operate to generate thrust and as they rotate between configurations. Efficient use of the structure in lift surface 102 can provide for a lighter craft, leading to less use of fuel and travel at greater speeds.

While FIG. 1 illustrates four edgewise blades or rotors 104, it is contemplated that any suitable number of edgewise blades or rotors may be incorporated (for example, the craft may utilize more or less than four edgewise blades or rotors 104). Edgewise blades or rotors may be configured to generate substantially vertical thrust. Edgewise blades or rotors may operate at a fixed pitch and/or a fixed rpm. In some embodiments, edgewise blades or rotors 104 may be positioned one either side of a lift surface and along booms 112. In some embodiments, edgewise blades or rotors 104 may be positioned on lift surface 102.

Edgewise blades or rotors 104 and proprotors 106 may be mechanically powered by one or more electric motors. It is contemplated that, in some embodiments, each edgewise blade 104 and/or proprotor 106 may be powered by a dedicated motor, or one or more edgewise blades or rotors 104 and/or proprotors 106 may be powered by a shared motor. As one example, two edgewise blades or rotors 104 along one boom 112 may share a motor. It is contemplated that the motors discussed herein could be traditional fuel powered motors, electric motors, and/or hybrid motors. In some embodiments, a motor and rotor may be connected to a transmission that controls the use power generated by the motor. The transmission may be a continuously variable transmission (CVT), or an automatic transmission, or a manual or semi-manual transmission to shift one or more gears to output differing amounts of power.

Edgewise blades or rotors and/or proprotors may be constant speed rotors or variable speed rotors. Edgewise blades or rotors and/or proprotors may be at a constant angle of attack or have a changeable angle of attack (e.g., changeable through one or more actuators).

Speed, position and/or angle of attack may be changed and/or gear may be shifted individually, as a set at the same time, or for all proprotors and/or all edgewise blades or rotors simultaneously. For example, four edgewise blades or rotors 104 may all change speed at once to initiate a takeoff sequence and/or landing sequence. As another example, proprotors 106 may be shifted from a take-off and landing configuration to a cruise condition simultaneously. As another example, two proprotors 106 and four edgewise blades or rotors 104 may all change speed and/or angle of attack to affect a take-off and landing sequence simultaneously.

Edgewise blades or rotors 104 may be located at any position on the craft, as will be understood by a person of ordinary skill in the art. As illustrated in FIG. 1, a first edgewise blade 104 may be positioned forward of the lift surface 102 on a first side of the body, a second edgewise blade 104 may be positioned aft of the lift surface on the first side of the body, a third edgewise blade 104 may be positioned forward of the lift surface on a second side of the body, and a fourth edgewise blade 104 may be positioned aft of the lift surface on the second side of the body. Edgewise blades or rotors 104 may also be mounted on one or more booms 112. The one or more booms 112 may include a battery pack configured to supply electrical power to one or more electric motors or may be utilized for storage of goods, electrical or mechanical components of the craft, or any other items known to those skilled in the art. While FIG. 1 illustrates two booms 112 configured substantially perpendicular to the top or bottom surface of the lift surface 102, a person of ordinary skill in the art will understand that more or less than two booms may be utilized, and they may be attached using known attachment techniques and/or arranged in any suitable configuration. The one or more booms 112 may include or connect to a tail 114 that comprises one or more control surfaces (e.g., one or more of an elevator, a rudder, a ruddervators, a spoiler, or similar). Control surfaces may be on relatively vertical portions of tail 114 or relatively horizontal portion 126 of tail 114.

Tail 114 may be linked aft of booms 112. In some embodiments, tail 114 may be linked aft of lift surface 102. Tail 114 may comprise an elevator along the link between one boom 112 and another boom 112. Tail structure 114 may be aft of body 110. Tail structure 114 may comprise control surfaces such as rudders and/or ruddervators, where the control surfaces extend upwards and/or downwards from booms 112. In some embodiments, at least one control surface may be positioned at least partially above a rotation plane of the edgewise blades. For example, a rudder, an elevator, or a ruddervators of tail 114 may extend partially above body 110 and/or edgewise blades. Tail 114 may be configured to provide control to the craft through control surfaces that are positioned in a freestream (e.g., relatively undisrupted air) when the craft is in a horizontal thrust configuration.

As discussed in greater detail below, a number of tail configurations are contemplated, including a T-tail, cruciform tail, dual tail, triple tail, V-tail, Bronco tail, low boom tail, or high boom tail. A Bronco tail may have relatively perpendicular vertical and horizontal surfaces. Tail 114 may have rounded edges between substantial vertical and horizontal surfaces to provide efficient support of substantially horizontal surfaces by the substantially vertical surfaces, considered when craft 100 is at rest on a ground surface. In some embodiments, a tail may extend from body 110 and booms 112 may be connected above the tail extending from the body, where the connection of booms 112 is separate from the tail extending from the body or connected to the tail extending from the body.

Proprotors 106 may be connected to lift surface 102 through a rotating linkage such as a rotating spar, and/or extending linkages. In some embodiments, the rotating spar may be actuated to rotate proprotor 106 relative to lift surface 102. Proprotors 106 may be positioned at any suitable location on the craft, including on the lift surface, on one or more sides of body 110, on a boom 112, or any other location. In some embodiments, extending linkages may be actuated to rotate proprotor 106 relative to lift surface 102. Actuators configured to actuate spars and/or rotating linkages may comprise one or more of a rotating actuator or a linear actuator.

Proprotors 106 may be configured in one configuration to rotate around and/or relative to an axis 108 substantially parallel with a ground surface and/or a lift surface, considered when the aircraft is at rest on the ground surface. As shown in FIG. 1, axis 108 extends along or within lift surface 102 from one end of lift surface 102 to another end of lift surface 102 The lift surface may include a first partial lift surface 122 at a first end of the lift surface 102 and a second partial lift surface 122 at a second end of the lift surface 102. As will be understood by a person of ordinary skill in the art, the first and second partial lift surfaces may have any shape suitable to maximize lift and minimize drag, thereby reducing fuel consumption. For example, the partial lift surface may be rectangular, circular, triangular, or any combination thereof.

In some embodiments, a first proprotor may be attached to the first partial lift surface such that the first partial lift surface moves with proprotors during movement of the proprotor relative to and/or rotation about axis 108. A second proprotor may be attached to the second partial lift surface such that the second partial lift surface moves with proprotors during movement of the proprotor relative to and/or rotation about axis 108. The partial lift surfaces 122 may include one or more control systems which may be operable by the pilot located in cabin 118. The partial lift surfaces 122 may be operated via actuators, active inceptors, sidesticks, switches, and/or buttons and may be configured to generate lift for vertical take-off and/or landing craft in a horizontal thrust configuration. The partial lift surfaces may also be configured to generate lift in a vertical thrust configuration. The partial lift surfaces 122 may comprise a wing portion with a similar cross-sectional area and/or airfoil shape to the rest of lift surface 102 (e.g., partial lift surfaces may comprise a continuation of lift surface 102). In some embodiments, the partial lift surfaces may comprise winglets, may consist of winglets, and in other embodiments, the partial lift surfaces may not have winglets. Whether the partial lift surfaces have winglets may depend on the type of cargo, travel time, and/or proprotor size. Partial lift surfaces 122 may each comprise a winglet 124 and a wing portion, as shown in FIG. 1. Winglets 124 may extend generally vertically from the end of the wing portions. Winglets 124 may be configured to reduce drag, as will be understood by a person of ordinary skill in the art.

In some embodiments, proprotors 106 may be configured to rotate or move about axis 108 along with partial lift surfaces 122, where the proprotors 106 and partial lift surfaces 122, 124 rotate outboard of booms 112. In some embodiments, where lift surface 102 is a separate structure from booms 112, proprotors 106 may move or rotate with lift surface 102 aside from portions of lift surface 102 that include body 110. In some embodiments, proprotors 106 may move or rotate such that only a portion of a proprotor hub 107 and blades 106 move or rotate. In some embodiments, the proprotor hub 107 may move or rotate with the partial lift surface about axis 108. Based on the shape of lift surface 102, the lift surface not including body 110 may rotate with proprotors 106 to increase lift and decrease drag, thereby reducing fuel consumption. The lift surface 102 shape may also vary throughout the length of boom 112. For example, the lift surface 102 may be rectangular shaped to support the weight of body 110, and may be thinner out to proprotor 106 to reduce drag when proprotor 106 is configured for horizontal operation and wider when proprotor 106 is configured for vertical operation.

Figure 2:
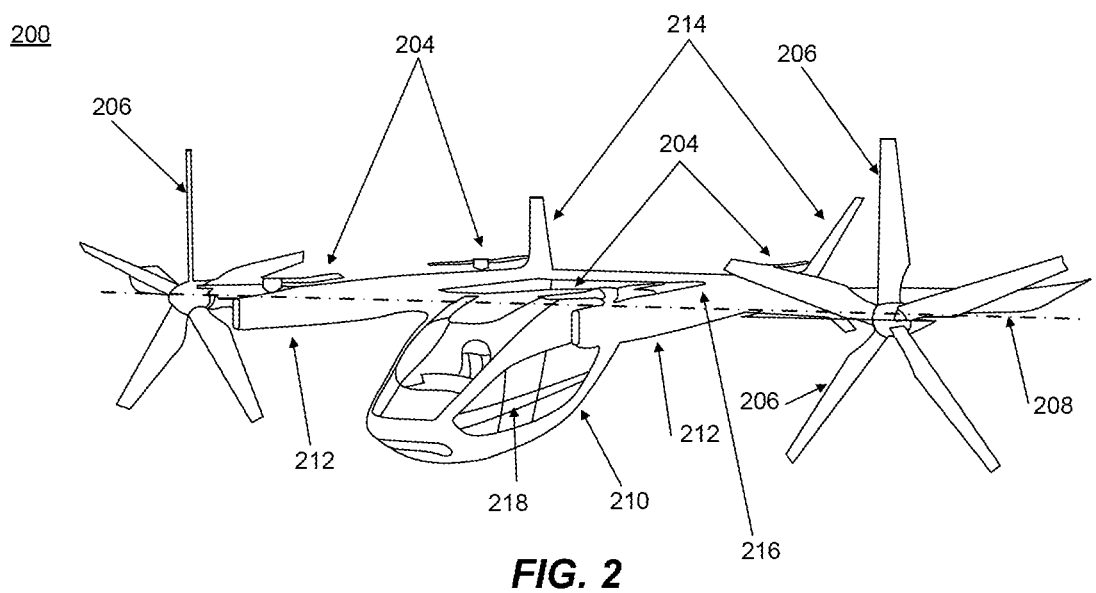
FIG. 2 illustrates a craft according to some embodiments of the present disclosure.

FIG. 2 shows vertical take-off and/or landing craft 200 in a horizontal thrust configuration Craft 200 of FIG. 2 is an exemplary version of craft 100 shown in FIG. 1 where craft 200 is in a horizontal thrust configuration in FIG. 2. Certain features of the vertical take-off and/or landing craft are not shown or discussed in these examples where such features may be similar to those discussed herein for other embodiments.

Body 210 may include landing gear that is configured for a land and/or water landing, as described for FIG. 1. While landing gear is illustrated in FIG. 1 as extending out of the body 110, and illustrated as being retracted into the body in FIG. 2, it is contemplated that the craft could operate in the vertical take-off and landing and horizontal thrust configurations with the landing gear either extended or retracted. A shown in FIG. 2, body 210 may include a door configured to shut to pressurize a cabin and/or provide an encapsulated volume for a pilot, a passenger, and/or cargo. Door 218 may be closed or opened automatically by the pilot, and in some embodiments, may contain and upper and lower portion wherein the lower portion contains stairs for passengers to ingress and egress the craft. Door 218 may be configured to automatically lock during operation. Body 210 may include a take-off and/or landing configuration where the landing gear is retracted.

Figure 3A:
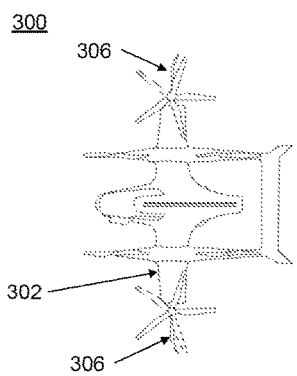
FIGS. 3A-3C illustrate a craft according to some embodiments of the present disclosure.
Figure 3B:
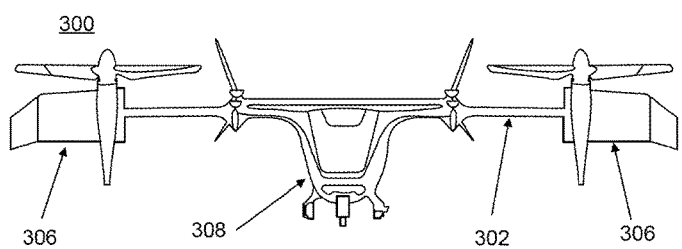
Figure 3C:
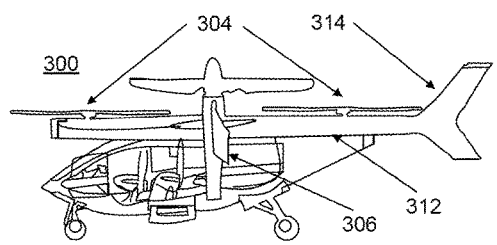

FIGS. 3A-3C illustrate a craft in a vertical take-off configuration according to some embodiments of the present disclosure. Certain features of the vertical take-off and/or landing craft are not shown or discussed in these examples where such features may be similar to those discussed for other embodiments. FIG. 3A shows a top view of the vertical take-off and/or landing craft in a vertical take-off configuration with lift surface ends 306 rotated substantially vertically. Lift surface ends 306 may include proprotors, proprotor hubs, and/or proprotor motors. The lift surface ends 306 may also be configured to rotate with the proprotors, so that the only portion of the lift surface 302 that does not rotate is the portion of the lift surface connected to body 308. Lift surface ends 306 may include portions of a wing and/or winglets. The wing or winglets of lift surface ends 306 may be configured to slow or resist rotation of craft 300 when craft 300 is in a vertical take-off and landing configuration. In some embodiments, lift surface ends may extend outboard from proprotors, and the first and second partial lift surfaces can be configured to resist a gyroscopic effect caused by the rotation of the proprotors in a vertical take-off and landing configuration. FIG. 3B shows a front view of the vertical take-off and/or landing craft. FIG. 3C shows a side view of the vertical take-off and/or landing craft, wherein the landing gear 308 described in FIG. 1 is shown.

Tail 314 may extend aft of body 308. Tail 314 may include control surfaces (e.g., one or more of a rudder, a ruddervators, an elevator) that extends above booms 312. Tail 314 may include control surfaces (e.g., one or more of a rudder, a ruddervators, an elevator) that extends above edgewise blades or rotors 304. Edgewise blades or rotors 304 may be positioned on either side of a center of gravity of craft 300, lift surface 302, body 308, and/or proprotors 306 to lift craft 300 evenly. Boom 312 may efficiently incorporate tail 314 as well as structures to support and power edgewise blades or rotors 304, as will be understood by a person of ordinary skill in the art.

Figure 4A:
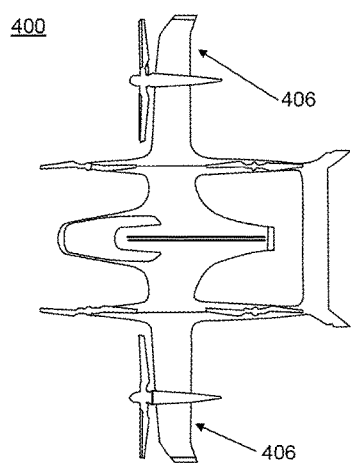
FIGS. 4A-4C illustrate a craft according to some embodiments of the present disclosure.
Figure 4B:
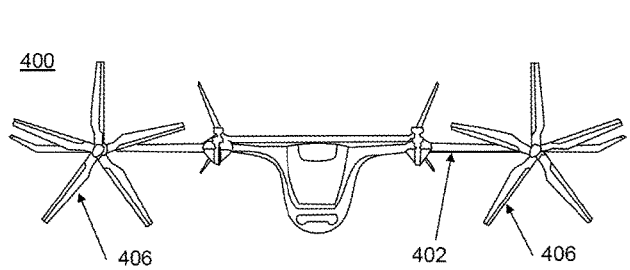
Figure 4C:
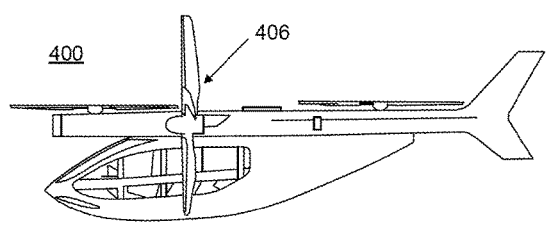

FIGS. 4A-4C illustrate a craft 400 in a horizontal thrust configuration according to some embodiments of the present disclosure. Craft 400 of FIGS. 4A-4C is an exemplary version of craft 300 shown in FIGS. 3A-3C where craft 400 is in a horizontal thrust configuration with landing gear retracted. Certain features of the vertical take-off and/or landing craft are not shown or discussed in these examples where such features may be similar to those discussed for other embodiments. FIG. 4A shows a top view of the vertical take-off and/or landing craft. FIG. 4B shows a front view of the vertical take-off and/or landing craft. FIG. 4C shows a side view of the vertical take-off and/or landing craft, wherein the landing gear described in FIG. 1 is retracted. Lift surface 402 and proprotor 406 are also shown.

Figure 5:
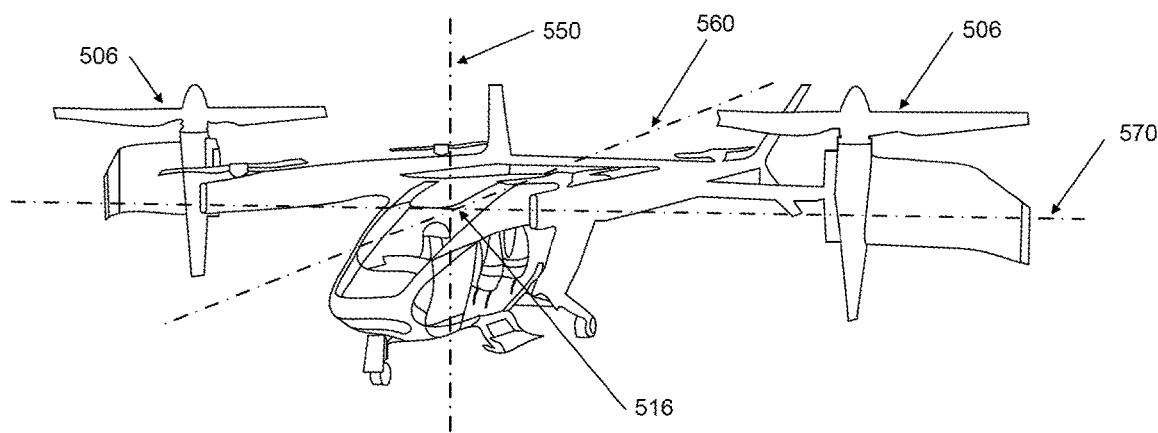
FIG. 5 illustrates a craft according to some embodiments of the present disclosure.

FIG. 5 illustrates a craft 500 according to some embodiments of the present disclosure. Certain features of vertical take-off and/or landing craft 500 are not shown or discussed in these examples where such features may be similar to those discussed for other embodiments. Vertical take-off and/or landing craft 500 may operate to move around or relative to axes 550, 560, and 570. Vertical take-off and/or landing craft 500 may include center of gravity 516 at a point of an intersection of axes 550, 560, and 570. Vertical axis 550 may be substantially vertical, and vertical take-off and/or landing craft 500 may move around or relative to vertical axis 550. Movement about the vertical axis may be in a horizontal plane parallel with lateral axis 570. Lateral axis 570 may be substantially lateral along a lift surface, and vertical take-off and/or landing craft 500 may move around or relative to lateral axis 570. During operation, the craft may rotate about lateral axis 570 and may affect travel path relative lateral axis 570. For example, movement about lateral axis 570 may be forward or aft motion. Longitudinal axis 560 may be perpendicular to lateral axis 570, and vertical take-off and/or landing craft 500 may move around or relative to longitudinal axis 560. In some embodiments, movement about longitudinal axis 560 may affect travel path the side to side direction, relative to a pilot facing forward while operating the craft. Proprotors 506 are also shown.

Figure 6A:
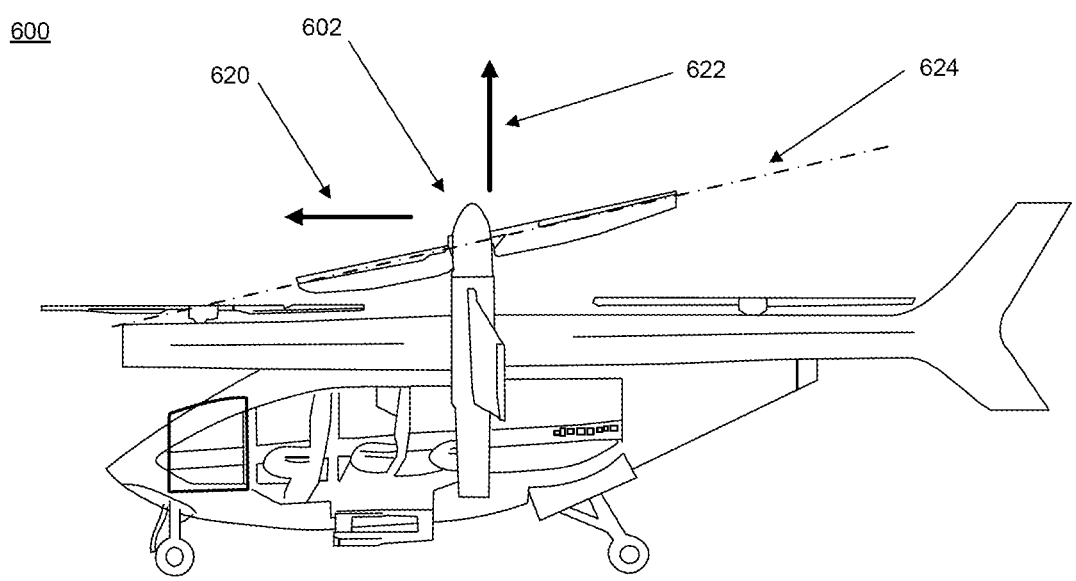
FIGS. 6A-6B illustrate a craft according to some embodiments of the present disclosure.
Figure 6B:
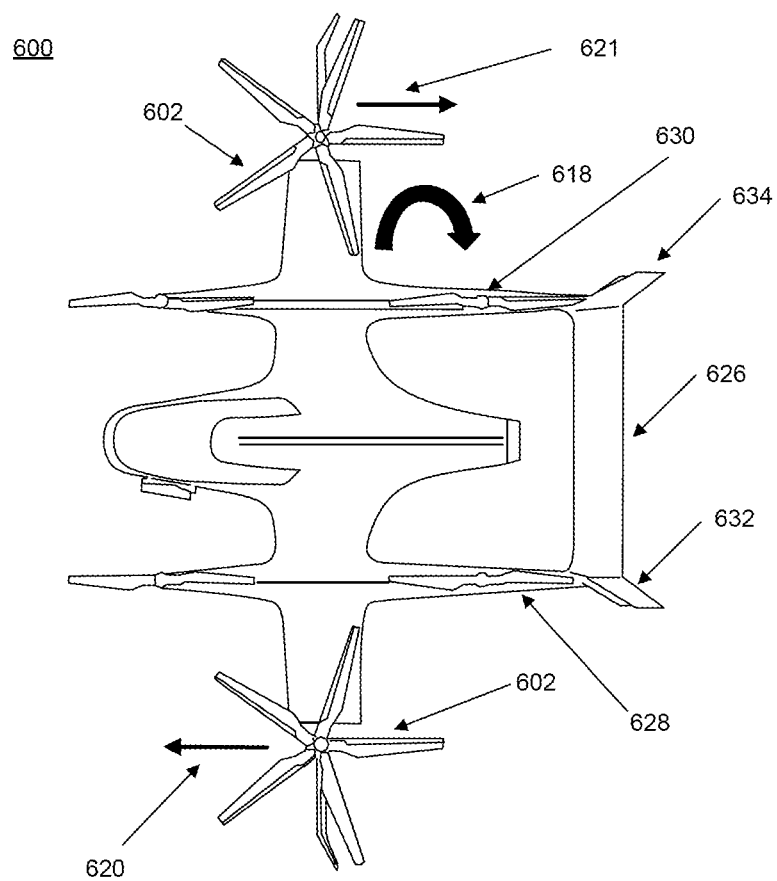

FIGS. 6A-6B show a craft 600 according to some embodiments of the present disclosure. Certain features of vertical take-off and/or landing craft 600 are not shown or discussed in these examples where such features may be similar to those discussed for other embodiments.

FIG. 6A shows 600 according to some embodiments of the present disclosure. Vertical take-off and/or landing craft 600 may include first proprotor 602. Proprotor 602 may be configured to operate at an angle. Proprotor 602 may operate where proprotor 602 is position on or relative to tilt plane 624. When proprotor 602 operates or relative to tilt plane 624, proprotor 602 may generate substantially forward thrust 620 and substantially vertical thrust 622. In some embodiments, proprotor 602 may move the craft about lateral axis 570, described in FIG. 5.

FIG. 6B shows craft 600 according to some embodiments of the present disclosure. Vertical take-off and/or landing craft 600 may include first proprotor 602 and second proprotor 602. First proprotor 602 may operate at a first tilt plane, such as tilt plane 624 (shown in FIG. 6A), and second proprotor 602 may operate at a second tilt plane. First tilt plane may generate forward thrust 620. Second tilt plane may generate reverse thrust 621. Second tilt plane may be at an angle opposite the first tilt plane. First proprotors 602 may be configured to generate forward thrust 620 and second proprotor 602 may be configured to generate reverse thrust 621 to maintain a desired yaw control. The desired yaw control may be a desired direction of vertical take-off and/or landing craft 600 relative to yaw direction 618. Forward thrust 620 and reverse thrust 621 may be used to operate vertical take-off and/or landing craft 600 when vertical-take-off craft 600 is operating in a hover configuration. In a hover configuration, the craft may not move along the vertical axis. Yaw direction 618 is representative of a direction around and relative to a vertical axis of a center of gravity (e.g., vertical axis 550 of FIG. 5). Tilting may be useful to travel relatively short distances in a city (e.g., while taxiing) when a cruise configuration is unnecessary. Proprotors Vertical take-off and/or landing craft 600 may include aft surface 626 that extends between a first boom 628 and a second boom 630 and/or between aft tail structures. Aft surface 626 may include a control surface such as an elevator, which may control the craft's pitch and angle of attack. The first boom may include or be attached to vertical stabilizer 632. Aft tail structures may include vertical stabilizer 632. Vertical stabilizer 632 may comprise a first rudder, which may control the craft's movement about the vertical axis described in FIG. 5. The second boom may include or be attached to vertical stabilizer 634. Aft tail structures may include vertical stabilizer 634. Vertical stabilizer 634 may comprise a second rudder, which may also control movement about the vertical axis described in FIG. 5.

Figure 7:
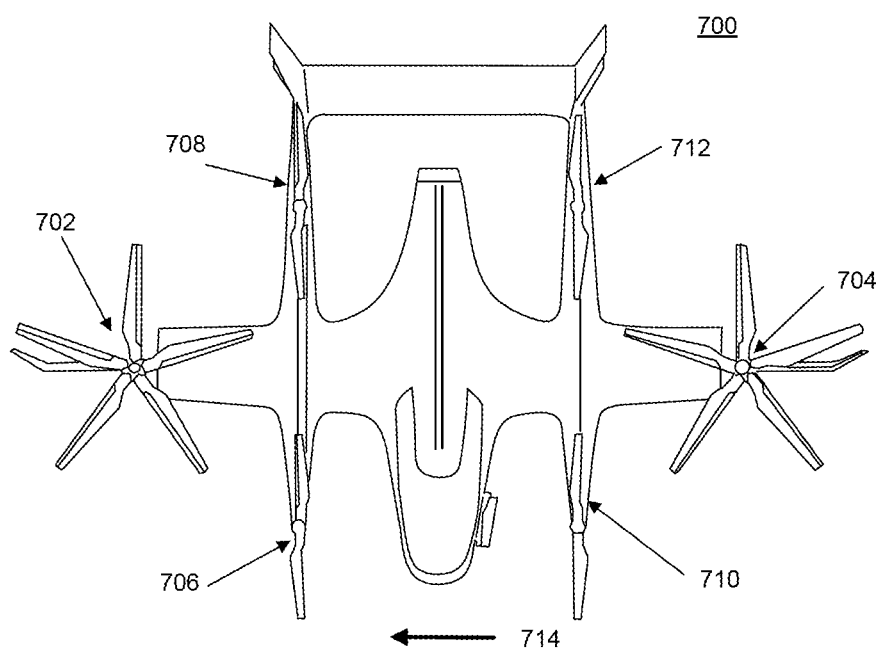
FIG. 7 illustrates a craft according to some embodiments of the present disclosure.

FIG. 7 shows craft 700 according to some embodiments of the present disclosure. Certain features of vertical take-off and/or landing craft 700 are not shown or discussed in these examples where such features may be similar to those discussed for other embodiments.

Vertical take-off and/or landing craft 700 may include first proprotor 702, second proprotor 704, first edgewise blade 706, second edgewise blade 708, third edgewise blade 710, and fourth edgewise blade 712. One or more of first proprotor 702, second proprotor 704, first edgewise blade 706, second edgewise blade 708, third edgewise blade 710, and fourth edgewise blade 712 may be configured to operate at a thrust greater than that produced by one or more of first proprotor 702, second proprotor 704, first edgewise blade 706, second edgewise blade 708, third edgewise blade 710, and fourth edgewise blade 712. To control a roll of vertical take-off and/or landing craft 700, a first set of blades on a first side of a body of vertical take-off and/or landing craft 700 may operate with an increased thrust relative to a second set of blades on a second side of the body. The pilot may control the proprotors, proprotor blades, and/or edgewise blades or rotors with pilot controls including at least one of an actuator, active inceptor, sidestick, switch, and/or buttons. The pilot controls may control one or more proprotors, proprotor blades, and/or edgewise blades or rotors in unison or separately or as subsets to change speed, tilt, rotation of proprotors, on or off, power, or similar.

First proprotor 702 may operate alone or in conjunction with first and second edgewise blades or rotors 706, 708 to increase or decrease relative thrust on the first side of vertical take-off and/or landing craft 700. Second proprotor 704 may operate alone or in conjunction with third and fourth edgewise blades or rotors 710, 712 to increase or decrease relative thrust on the second side of vertical take-off and/or landing craft 700. One or more of blades 702, 704, 706, 708, 710, and 712 may be configured to change thrust to control a roll of vertical take-off and/or landing craft 700 in a hover configuration. Roll direction 714 is representative of a direction around and relative to longitudinal axis 560 in FIG. 5. One or more of blades 702, 704, 706, 708, 710, and 712 may be configured to operate at an increased or decreased rpm to change a corresponding thrust to control roll of vertical take-off and/or landing craft 700. One or more of blades 702, 704, 706, 708, 710, and 712 may be configured to operate at an angle to change a corresponding thrust to control a roll of vertical take-off and/or landing craft 700. In some embodiments, the proprotors may be configured to rotate up to 180 degrees about the lateral axis 570, and the edgewise blades or rotors may be configured to rotate up to 180 degrees about the longitudinal axis 560.

Figure 8:
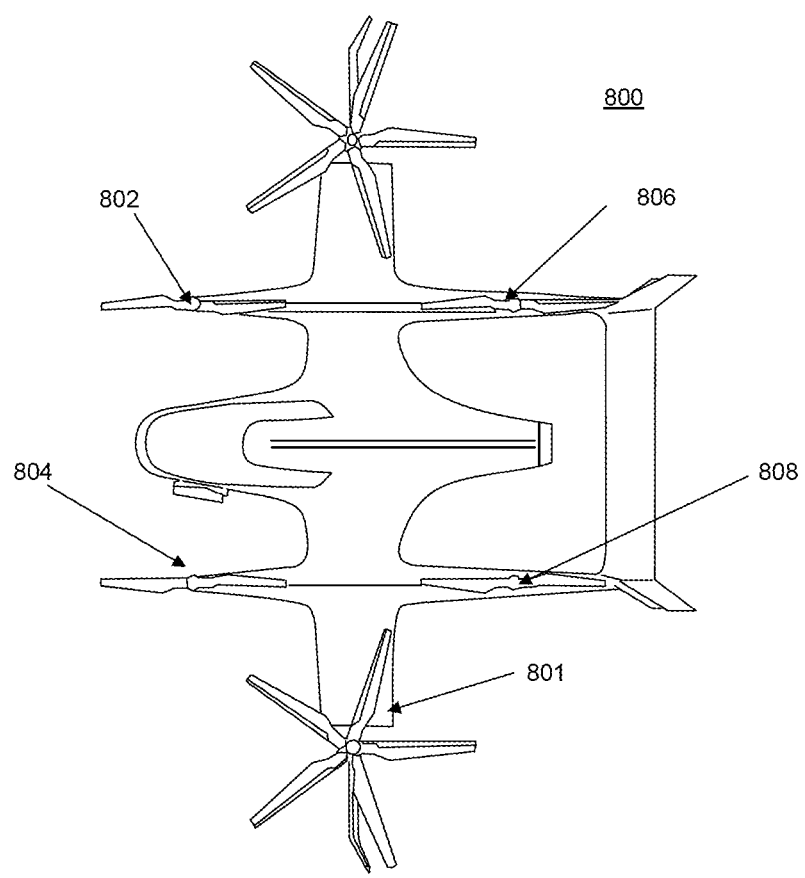
FIG. 8 illustrates a craft according to some embodiments of the present disclosure.

FIG. 8 shows craft 800 according to some embodiments of the present disclosure. Certain features of vertical take-off and/or landing craft 800 are not shown or discussed in these examples where such features may be similar to those discussed for other embodiments.

Figure 9:
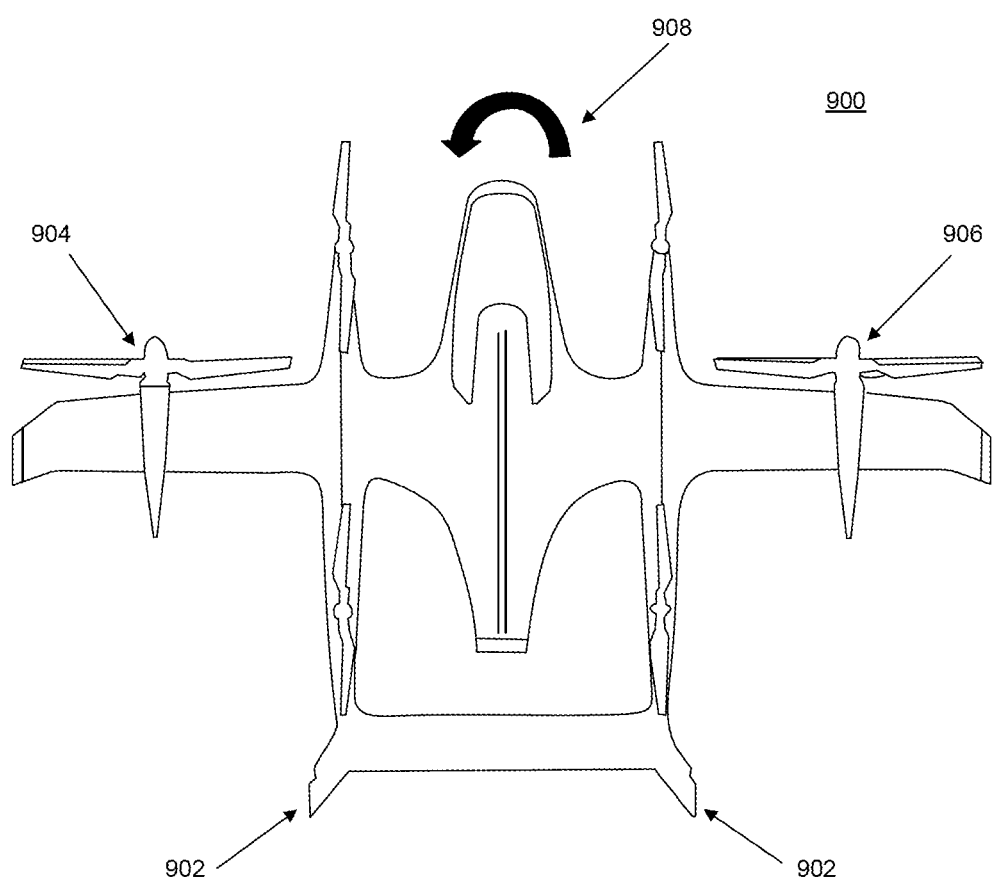
FIG. 9 illustrates a craft according to some embodiments of the present disclosure.

FIG. 8 shows vertical take-off and/or landing craft 800. Vertical take-off and/or landing craft 800 may include first edgewise blade 802, second edgewise blade 804, third edgewise blade 806, and fourth edgewise blade 808. One or more of first edgewise blade 802, second edgewise blade 804, third edgewise blade 806, and fourth edgewise blade 808 may be configured to operate at a thrust greater than that produced by one or more of first edgewise blade 802, second edgewise blade 804, third edgewise blade 806, and fourth edgewise blade 808. To control a pitch of vertical take-off and/or landing craft 800, a first set of blades on a first side of lift surface 801 of vertical take-off and/or landing craft 800 may operate with an increased thrust relative to a second set of blades on a second side of lift surface 801. First edgewise blade 802 may operate alone or in conjunction with second edgewise blade 804 to increase or decrease relative thrust on the front side of vertical take-off and/or landing craft 800 forward of lift surface 801. First edgewise blade 802 may operate alone or in conjunction with second edgewise blade 804 to increase or decrease relative thrust on the aft side of vertical take-off and/or landing craft 800 aft of lift surface 801. One or more of blades 802, 804, 806, 808 may be configured to change thrust to control a pitch of vertical take-off and/or landing craft 800 in a hover configuration. Movement of vertical take-off and/or landing craft 800 in pitch may be around and relative to lateral axis 570 in FIG. 5. One or more proprotors may be tilted as described relative to FIGS. 6A-6B above in conjunction with controlling the thrust of one or more of first edgewise blade 802, second edgewise blade 804, third edgewise blade 806, and fourth edgewise blade 808 to control a pitch of vertical take-off and/or landing craft 800. The pilot may control the proprotors and edgewise blades or rotors with pilot controls including at least one of an actuator, active inceptor, sidestick, switch, and/or buttons FIG. 9 shows craft 900 according to some embodiments of the present disclosure. Certain features of vertical take-off and/or landing craft 900 are not shown or discussed in these examples where such features may be similar to those discussed for other embodiments. Vertical take-off and/or landing craft 900 may include control surfaces 902. Vertical take-off and/or landing craft 900 may include first proprotor 904 and second proprotor 906. Control surfaces 902 may each include a rudder. Control surfaces 902 may be configured to control a yaw, such as in a direction indicated by yaw direction 908, of vertical take-off and/or landing craft 900. Control surfaces 902 may operate alone or in conjunction with proprotor 904 and/or 906 to control a yaw of vertical take-off and/or landing craft 800 when vertical take-off and/or landing craft 900. Proprotor 904 and/or proprotor 906 may be configured to change a thrust alone or together to control yaw of vertical take-off and/or landing craft 900. Control surfaces 902 and/or proprotors 904, 906 may be configured to control a yaw of vertical take-off and/or landing craft 900 in a horizontal thrust configuration. Yaw direction 908 is representative of a direction around or relative to vertical axis 550 in FIG. 5. The pilot may operate the control surfaces 902 with pilot controls including at least one of an actuator, active inceptor, sidestick, switch, and/or buttons.

Figure 10:
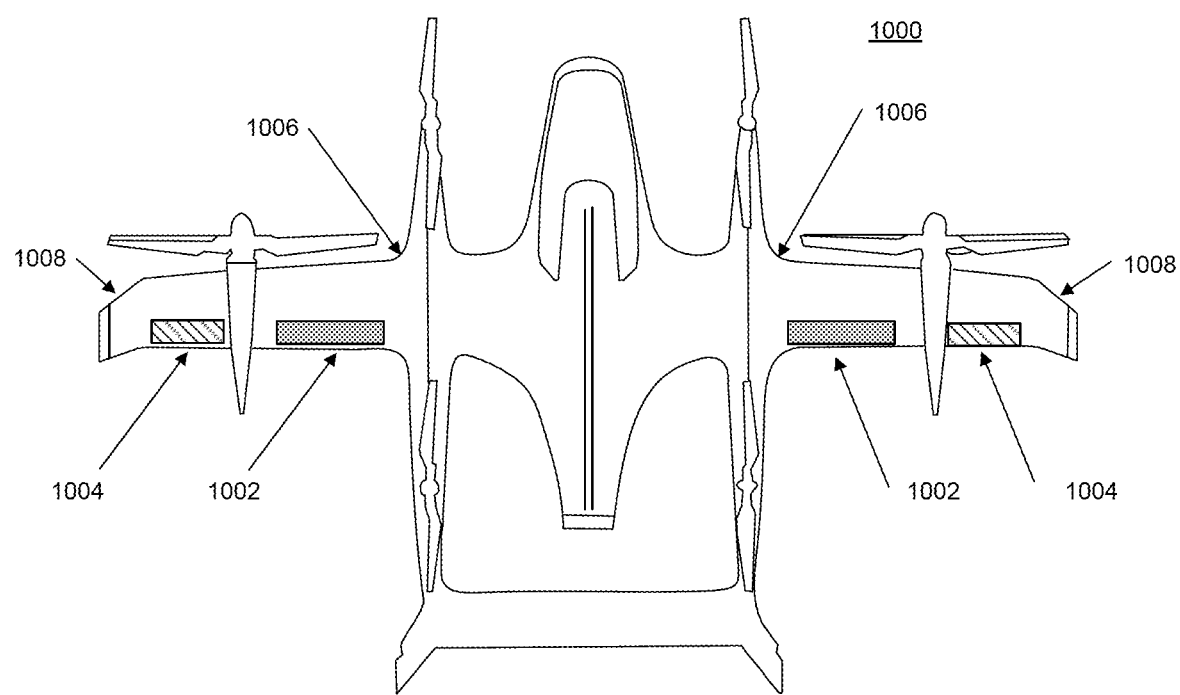
FIG. 10 illustrates a craft according to some embodiments of the present disclosure.
Figure 11:
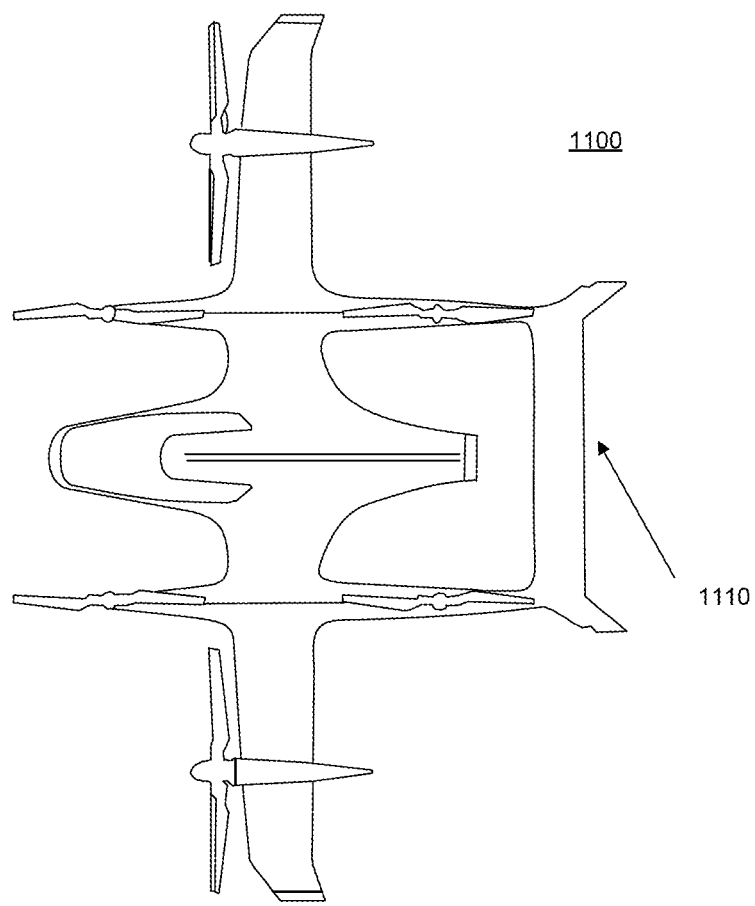
FIG. 11 illustrates a craft according to some embodiments of the present disclosure.

FIG. 10 shows craft 1000 according to some embodiments of the present disclosure. Certain features of vertical take-off and/or landing craft 1000 are not shown or discussed in these examples where such features may be similar to those discussed for other embodiments. Vertical take-off and/or landing craft 1000 may include first control surfaces 1002. Vertical take-off and/or landing craft 1000 may include second control surfaces 1004. First control surfaces 1002 may include a flap, a flaperon, and/or an aileron. Second control surfaces 1004 may include a flap, a flaperon, and/or an aileron. First control surfaces 1002 and/or second control surfaces 1004 may be configured to control a roll of vertical take-off and/or landing craft 1000. Positions of control surfaces of 1000 are exemplary, and control surfaces could be located at different positions along lift surfaces 1006 and/or partial lift surfaces 1008. First control surfaces 1002 and/or second control surfaces 1004 may be configured to control a roll of vertical take-off and/or landing craft 1000 when vertical take-off and/or landing craft 1000 is in a horizontal thrust configuration. Roll may be a direction around or relative to longitudinal axis 560 in FIG. 5. The pilot may operate the control surfaces 1002, 1004 with pilot controls including at least one of an actuator, active inceptor, sidestick, switch, and/or buttons FIG. 11 shows craft 1100 according to some embodiments of the present disclosure. Certain features of vertical take-off and/or landing craft 1100 are not shown or discussed in these examples where such features may be similar to those discussed for other embodiments. Vertical take-off and/or landing craft 1100 may include elevator 1110. Elevator 1110 may be configured to control a pitch of vertical take-off and/or landing craft 1100 during operating of vertical take-off and/or landing craft 1100 in a horizontal thrust configuration. Movement of vertical take-off and/or landing craft 1100 in pitch may be around and relative to lateral axis 570 in FIG. 5.

Figure 12:
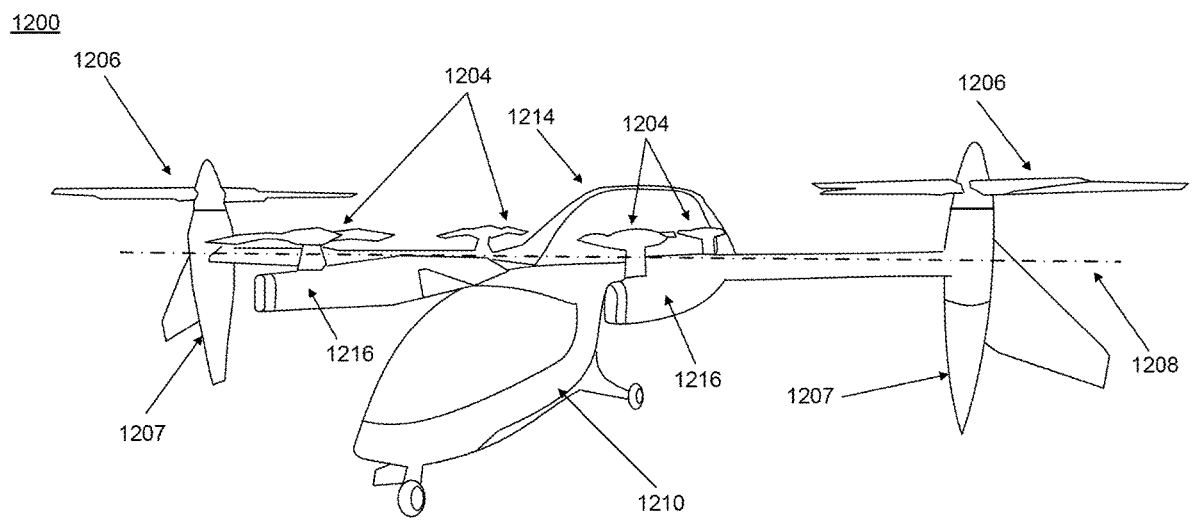
FIG. 12 illustrates a craft according to some embodiments of the present disclosure.

FIG. 12 shows a craft 1200 in a vertical take-off configuration according to some embodiments of the present disclosure. Certain features of the vertical take-off and/or landing craft are not shown or discussed in these examples where such features may be similar to those discussed herein for other embodiments. Edgewise blades or rotors 1204, proprotors 1206, body 1210, proprotor hubs 1207, and booms 1216 are similar to corresponding structures discussed above with respect to FIG. 1, and the discussion regarding those elements in FIG. 1 is equally applicable to those elements in other figures. Proprotors 1206 may be configured to move around and/or relative to axis 1208. Axis 1208 may extend laterally across a wing or wings. Axis 1208 may be substantially parallel with a ground surface. Axis 108 may extend laterally through body 1210. Axis 1208 may be substantially parallel with a ground surface. Axis 1208 may extend from one side of craft 1200 to the other side (e.g., laterally along a lift surface). Proprotors 1206 may be positioned on the lift surface on each of one side of body 1210. Respective proprotors or blades 1206 may be mounted on respective proprotor hubs 1207. The lift surface may include a first partial lift surface at a first end of the lift surface and a second partial lift surface at a second end of the lift surface. A first proprotor may be attached to the first partial lift surface such that the first partial lift surface moves with proprotors during movement of the proprotor relative to and/or rotation about axis 1208. The proprotor hubs 1207 may also rotate with the partial lift surface about axis 1208. A second proprotor may be attached to the second partial lift surface such that the second partial lift surface moves with proprotors during movement of the proprotor relative to and/or rotation about axis 1208. The partial lift surfaces may include one or more control systems. The one or more control systems may be operable by an onboard pilot, an onboard computer (e.g., autonomously), or from a control outside of the craft (e.g., remotely), or a mixture of one or more of an onboard pilot, an onboard computer, and/or a control outside of the aircraft. The partial lift surfaces may be configured to generate lift for vertical take-off and/or landing craft in a horizontal thrust configuration. Proprotors 1206 may be spaced above a proprotor hub (e.g., proprotor pylon or proprotor nacelle) of vertical take-off and/or landing craft 1200 to avoid a blade strike.

Edgewise blades or rotors 1204 may comprise first, second, third, and fourth edgewise blades or rotors. Depending on the purpose of the craft (e.g., passenger as opposed to cargo transportation), more edgewise blades or rotors may be attached to the craft. Edgewise blades or rotors may be configured to generate substantially vertical thrust. Edgewise blades or rotors may operate at a fixed pitch and/or a fixed rpm. Edgewise blades or rotors 1204 may be spaced above a lift surface (e.g., a wing) of vertical take-off and/or landing craft 1200 to avoid a blade strike. Edgewise blades or rotors may also be configured to rotate in order to generate vertical thrust in a particular direction quickly.

A first edgewise blade may be positioned forward of the lift surface on a first side of the body 1210, a second edgewise blade may be positioned aft of the lift surface on the first side of the body 1210, a third edgewise blade may be positioned forward of the lift surface on a second side of the body, and a fourth edgewise blade may be positioned aft of the lift surface on the second side of the body. Edgewise blades or rotors 1204 may be mounted on one or more booms 1216.

Body 1210 may include a landing gear. Body 1210 may include a cockpit. Body 1210 may include a door configured to open to allow a pilot, a passenger, and/or cargo. Body 1210 may include a configuration for ingress and egress. Body 1210 may include a take-off and/or landing configuration (e.g., extended landing gear) and a cruise configuration (e.g., retracted) for a landing gear and/or a body. The door is shown as closed in FIG. 12. The landing gear is shown as extended in FIG. 12.

The vertical take-off and/or landing craft can include tail 1214. Tail 1214 may be considered to be a bronco tail. Tail 1214 can be a tail that extends from both a first boom 1216 and a second boom 1218, wherein the tail connects above the first boom 1216 and the second boom 1218.

Figure 13:
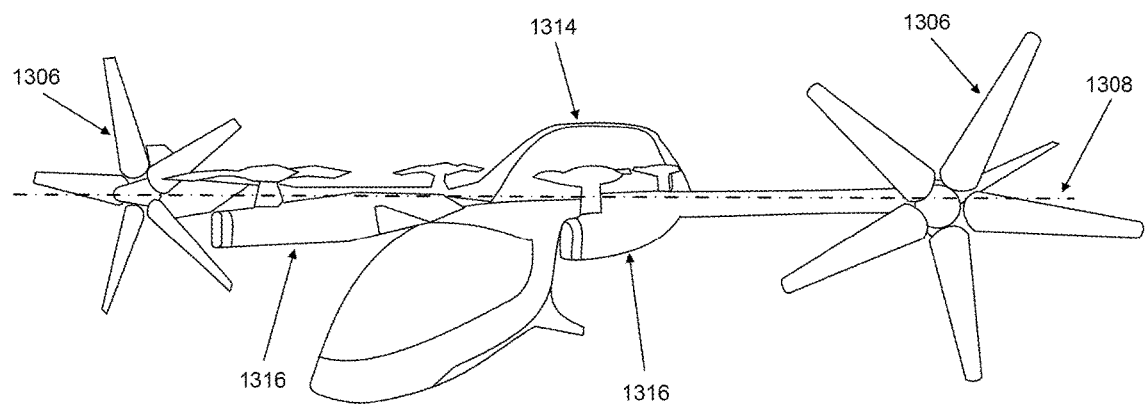
FIG. 13 illustrates a craft according to some embodiments of the present disclosure.

FIG. 13 illustrates a craft 1300 in a horizontal thrust configuration according to some embodiments of the present disclosure. Craft 1300 of FIG. 12 may be exemplary versions of craft 1200 shown in FIG. 12 where craft 1300 is in a horizontal thrust configuration in FIG. 12. The horizontal thrust configuration may operate as a cruise configuration. Certain features of vertical take-off and/or landing craft 1300 are not shown or discussed in these examples where such features may be similar to those discussed for other embodiments.

FIG. 13 shows vertical take-off and/or landing craft 1300 with a door that is closed. FIG. 13 shows vertical take-off and/or landing craft 1300 with a landing gear that is retracted.

Figure 14A:
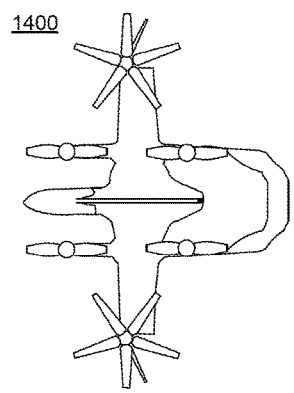
FIGS. 14A-14C illustrate a craft according to some embodiments of the present disclosure.
Figure 14B:
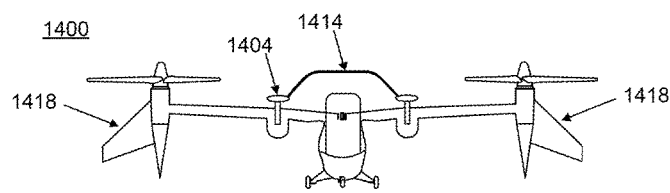
Figure 14C:
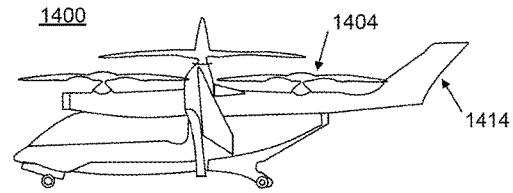

FIGS. 14A-14C illustrate a craft 1400 in a vertical take-off configuration according to some embodiments of the present disclosure. Certain features of the vertical take-off and/or landing craft are not shown or discussed in these examples where such features may be similar to those discussed for other embodiments. FIG. 14A shows a top view of craft 1400. FIG. 14B shows a front view of craft 1400. FIG. 14C shows a side view of craft 1400.

FIGS. 14A-14C show an exemplary placement of edgewise blades or rotors 1404 relative to tail 1414. Edgewise blades or rotors 1404 may be on the booms 1416 and clear of tail 1414. For example, tail 1414 may be shaped to extend upwards aft of an edgewise blade 1404 to provide structural support to tail 1414 and/or one or more control surfaces of tail 1414. Tail 1414 may be slanted from a position under an edgewise blade 1404 to a position upward and aft of edgewise blade 1404, where the position under an edgewise blade 1404 is considered to be a full rotation of blade 1404. Full rotation may include a rotation of up to 180 degrees. Tail 1414 may comprise a slanted forward edge or a slanted aft edge. Tail 1414 may be slanted aft from proprotors and/or edgewise blades or rotors 1404, as shown in FIG. 14C, to provide separation and/or reduced risk of a blade strike. Tail 1414 may support a substantially horizontal portion of tail 1414 from substantially slanted vertical portions of tail 1414, as shown in FIG. 14B. Tail 1414 may be rounded between horizontal and vertical portions. Tail 1414 may extend aft beyond booms 1416. Tail 1414 may provide leverage for one or more control surfaces above blades 1404 and one or more control surfaces aft of blades 1404. Tail 1414 may be comprised of any known configuration, as discussed in FIG. 1. Partial lift surface 1418 is also shown.

Figure 15A:
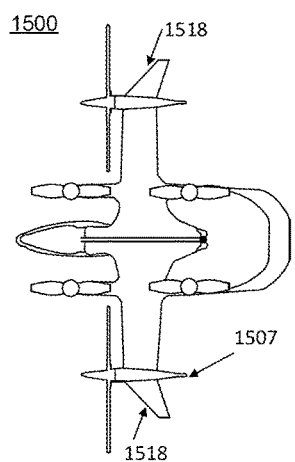
FIGS. 15A-15C illustrate a craft according to some embodiments of the present disclosure.
Figure 15B:
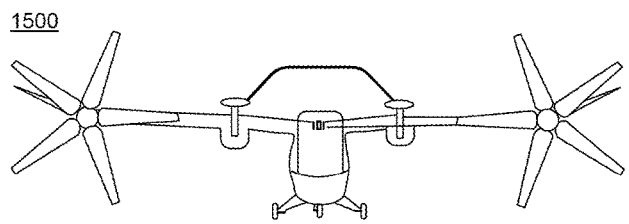
Figure 15C:
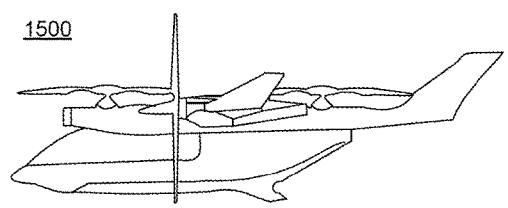

FIGS. 15A-15C illustrate a craft 1500 in a horizontal thrust configuration according to some embodiments of the present disclosure. Craft 1500 of FIGS. 15A-15C may be exemplary versions of craft 1400 shown in FIGS. 14A-14C, where craft 1500 is in a horizontal thrust configuration in FIGS. 15A-15C. Certain features of the vertical take-off and/or landing craft are not shown or discussed in these examples where such features may be similar to those discussed for other embodiments. FIG. 15A shows a top view of craft 1500. Lift surface ends 1518 may be configured to reduce drag in a horizontal thrust configuration. Lift surface ends 1518 may include winglets. FIG. 15B shows a front view of craft 1500. FIG. 15C shows a side view of craft 1500.

Vertical take-off and/or landing craft 1500 may comprise winglets 1518. Winglets 1518 may extend upward from proprotor hubs 1507 when vertical take-off and/or landing craft 1500 is in a cruise configuration. In some embodiments, the craft 1500 may not include winglets.

Figure 16A:
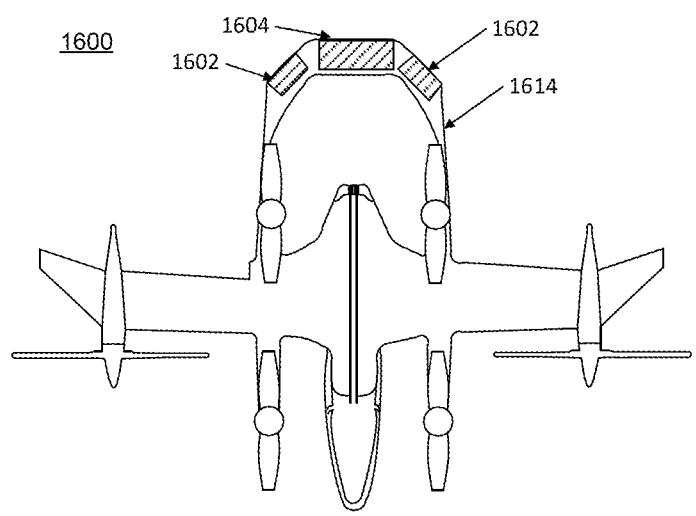
FIGS. 16A-16B illustrate a craft according to some embodiments of the present disclosure.
Figure 16B:
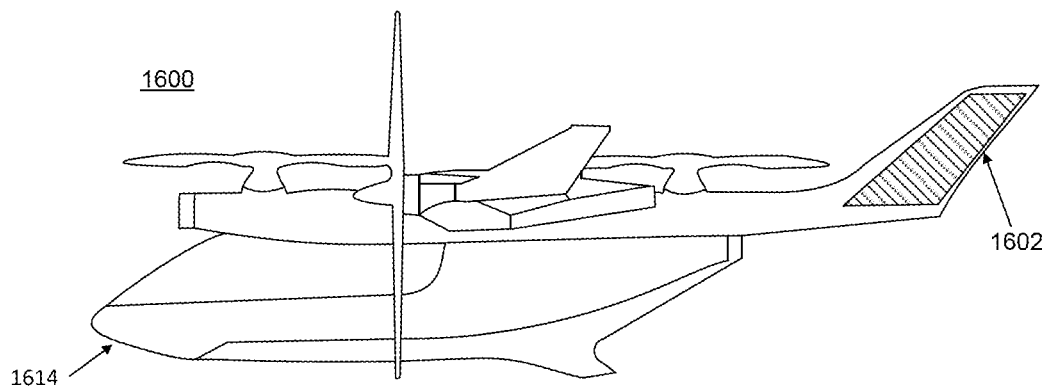

FIGS. 16A-16B illustrate a craft 1600 in a horizontal thrust configuration according to some embodiments of the present disclosure. Certain features of vertical take-off and/or landing craft 1600 are not shown or discussed in these examples where such features may be similar to those discussed for other embodiments. Tail 1614 may comprise one or more control surfaces 1602. Tail 1614 may comprise elevator 1604 disposed on a relatively horizontal portion of tail 1614. Tail 1614 may comprise two control surfaces 1602 configured to act as elevators and/or rudders on respective upward portions of tail 1614. In some embodiments, tail 1614 may include more than two control surfaces depending on the tail configuration. Actuators for control surfaces 1602, 1604 may be within tail 1614 and may be operable by the pilot via active inceptors, sidesticks, and/or a joystick. Control modes for the control surfaces may be operated mechanically or electronically. In some embodiments, the control surfaces may have a default setting.

Figure 17:
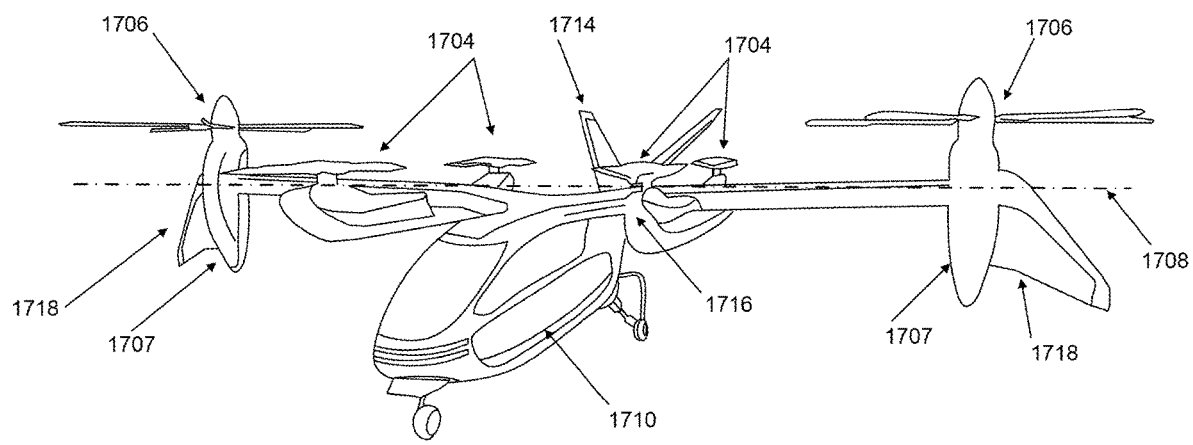
FIG. 17 illustrate a craft according to some embodiments of the present disclosure.

FIG. 17 illustrates a craft 1700 in a vertical take-off configuration according to some embodiments of the present disclosure. Certain features of the vertical take-off and/or landing craft are not shown or discussed in these examples where such features may be similar to those discussed herein for other embodiments.

Vertical take-off and/or landing craft 1700 may include edgewise blades or rotors 1704, proprotors 1706, and body 1710. Proprotors 1706 may be configured to move around and/or relative to axis 1708. Axis 1708 may extend laterally across a wing or wings. Axis 1708 may be substantially parallel with a ground surface. Proprotors 1706 may be positioned on the lift surface on each of one side of body 1710. Respective proprotors or blades 1706 may be mounted on respective proprotor hubs 1707. The lift surface may include a first partial lift surface at a first end of the lift surface and a second partial lift surface at a second end of the lift surface. A first proprotor may be attached to the first partial lift surface such that the first partial lift surface moves with proprotors during movement of the proprotor relative to and/or rotation about axis 1708. A second proprotor may be attached to the second partial lift surface such that the second partial lift surface moves with proprotors during movement of the proprotor relative to and/or rotation about axis 1708. The partial lift surfaces may include one or more control systems. The one or more control systems may be operable by an onboard pilot, an onboard computer (e.g., autonomously), or from a control outside of the craft (e.g., remotely), or a mixture of one or more of an onboard pilot, an onboard computer, and/or a control outside of the aircraft.

The partial lift surfaces may be configured to generate lift and/or reduce drag for vertical take-off and/or landing craft in a horizontal thrust configuration. Proprotors 1706 may be spaced above a proprotor hub (e.g., proprotor pylon) of vertical take-off and/or landing craft 1700 to avoid a blade strike. The partial lift surface 1718, which may consist of winglets, is also shown. For example, winglets of partial lift surface 1718 may extend substantially vertically from proprotors 1706 when the craft is in a horizontal thrust configuration and/or aft when the craft is in a vertical take-off and landing configuration.

Edgewise blades or rotors 1704 may comprise first, second, third, and fourth edgewise blades or rotors. Edgewise blades or rotors may be configured to generate substantially vertical thrust. Edgewise blades or rotors may operate at a fixed pitch and/or a fixed rpm. Edgewise blades or rotors may also be configured to rotate in order to generate thrust in a particular direction quickly. Edgewise blades or rotors 1704 and proprotors 1706 may be mechanically powered by one or more electric motors. In some embodiments, one of the plurality of edgewise blades or rotors may be powered by one electric motor. In some embodiments, one of the plurality of proprotors may be powered by one electric motor. Edgewise blades or rotors 1704 may be spaced above a lift surface (e.g., a wing) of vertical take-off and/or landing craft 1700 to avoid a blade strike. The edgewise blades or rotors may also include battery packs that may power the edgewise blades or rotors in the event of a power failure.

A first edgewise blade may be positioned forward of the lift surface on a first side of the body, a second edgewise blade may be positioned aft of the lift surface on the first side of the body, a third edgewise blade may be positioned forward of the lift surface on a second side of the body, and a fourth edgewise blade may be positioned aft of the lift surface on the second side of the body. Edgewise blades or rotors 1704 may be mounted on one or more booms 1716. The one or more booms 1716 may be substantially perpendicular to the lift surface. Booms 1716 may comprise a connecting surface that connects below an upper surface of one or more lift surfaces of vertical take-off and/or landing craft 1700.

Body 1710 may include a landing gear. Body 1710 may include a cockpit. Body 1710 may include a door configured to open to allow a pilot, a passenger, and/or cargo. Body 1710 may include a configuration for ingress and egress. Body 1710 may include a take-off and/or landing configuration (e.g., extended landing gear) and a cruise configuration (e.g., retracted) for a landing gear and/or a body. The door is shown as closed in FIG. 17. The landing gear is shown as extended in FIG. 17.

The vertical take-off and/or landing craft can include tail 1714. Tail 1714 may be considered to be a V-tail. Tail 1714 can be a tail that extends from body 1710, wherein the tail splits into a V aft of body 1710. The tail may also be a different configuration as described in FIG. 1. In some embodiments, an inverted v-tail may be used.

Figure 18:
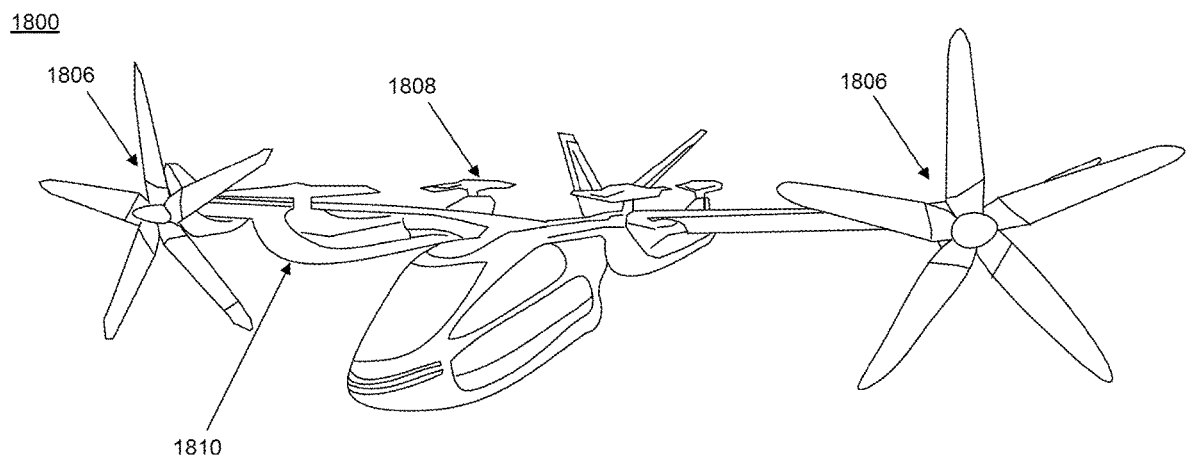
FIG. 18 illustrates a craft according to some embodiments of the present disclosure.

FIG. 18 illustrates a craft 1800 in a horizontal thrust configuration according to some embodiments of the present disclosure. Craft 1800 of FIG. 18 may be exemplary versions of craft 1700 shown in FIG. 17 where craft 1700 is in a horizontal thrust configuration in FIG. 18. The horizontal thrust configuration may operate as a cruise configuration. Certain features of vertical take-off and/or landing craft 1800 are not shown or discussed in these examples where such features may be similar to those discussed for other embodiments. Proprotors 1806 are shown in a horizontal thrust configuration in FIG. 18. FIG. 18 shows vertical take-off and/or landing craft 1800 with a closed door and retracted landing gear. Edgewise blades or rotors may be connected to one or more booms 1810.

Figure 19A:
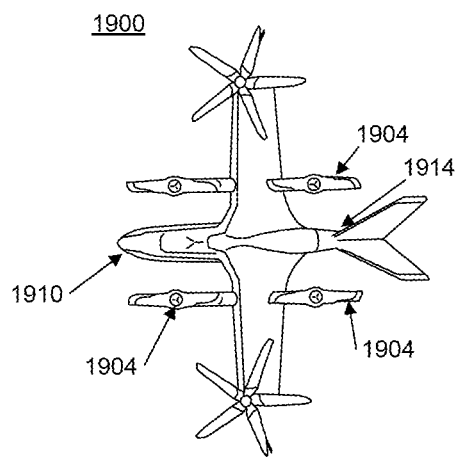
FIGS. 19A-19B illustrate a craft according to some embodiments of the present disclosure.
Figure 19B:
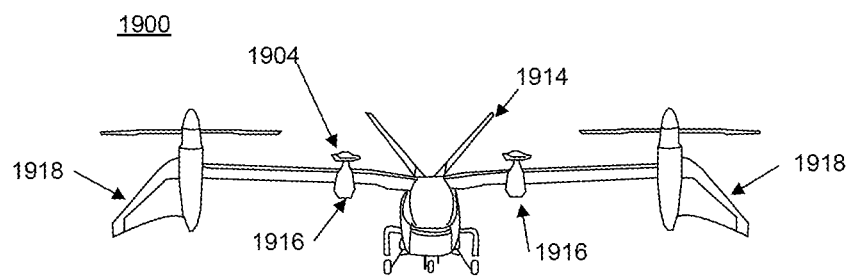

FIGS. 19A-19B illustrate a craft 1900 in a vertical take-off configuration according to some embodiments of the present disclosure.

Certain features of the vertical take-off and/or landing craft are not shown or discussed in these examples where such features may be similar to those discussed for other embodiments. FIG. 19A shows a top view of craft 1900. FIG. 19B shows a front view of craft 1900.

FIGS. 19A-19B show exemplary placement of edgewise blades or rotors 1904 relative to tail 1914. Edgewise blades or rotors 1904 may be on the booms 1916 and clear of tail 1914. For example, tail 1914 may extend aft from body 1910. Tail 1914 may extend upward aft of body 1910 and/or the booms 1916 and edgewise blades or rotors 1904 so that control surfaces of tail 1914 are not blocked. Tail 1914 may extend aft beyond booms 1916. Tail 1914 may provide leverage for one or more control surfaces above blades 1904 and one or more control surfaces aft of blades 1904. The one or more control surfaces may be considered to be rudder-vators. Tail 1914 may include relatively upright surfaces that extend from a central portion of tail 1914, wherein the surfaces extend at an angle with respect to a horizontal plane or axis (e.g., a ground plane). Partial lift surfaces 1918, which may contain winglets in some embodiments, are also shown.

Figure 20A:
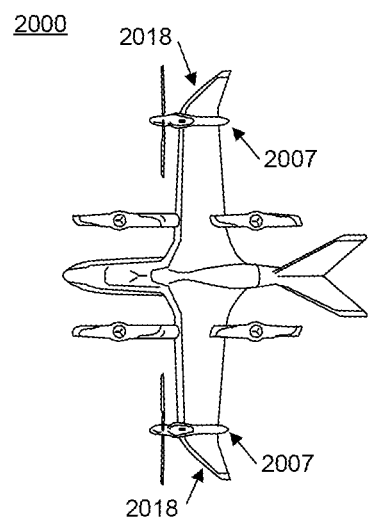
FIGS. 20A-20B illustrate a craft according to some embodiments of the present disclosure.
Figure 20B:
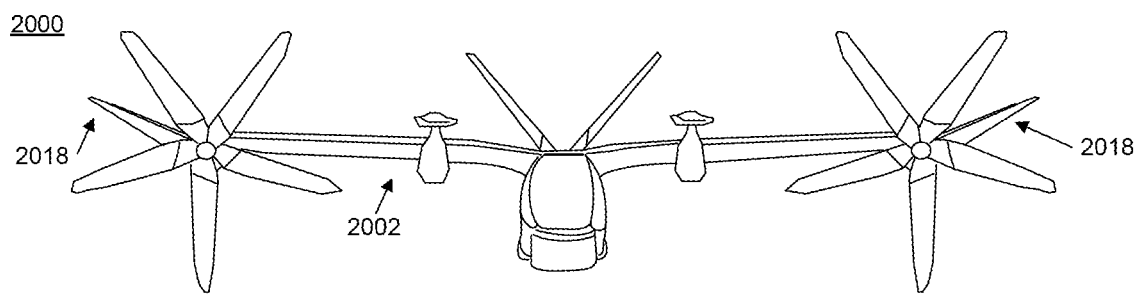

FIGS. 20A-20B illustrate a craft 2000 in a horizontal thrust configuration according to some embodiments of the present disclosure. Craft 2000 of FIGS. 20A-20B may be exemplary versions of craft 1900 shown in FIGS. 19A-19B, where craft 2000 is in a horizontal thrust configuration in FIGS. 20A-20B. Certain features of the vertical take-off and/or landing craft are not shown or discussed in these examples where such features may be similar to those discussed for other embodiments. FIG. 20A shows a top view of craft 2000.

Vertical take-off and/or landing craft 2000 may comprise winglets 2018. The winglets may extend at a variety of angles from lift surface 2002 to reduce drag, thereby improving an aircraft's fuel efficiency and cruising range. Winglets 2018 may extend upward from proprotor hubs 2007 and/or the lift surface 2002 when vertical take-off and/or landing craft 2000 is in a cruise configuration.

Figure 21A:
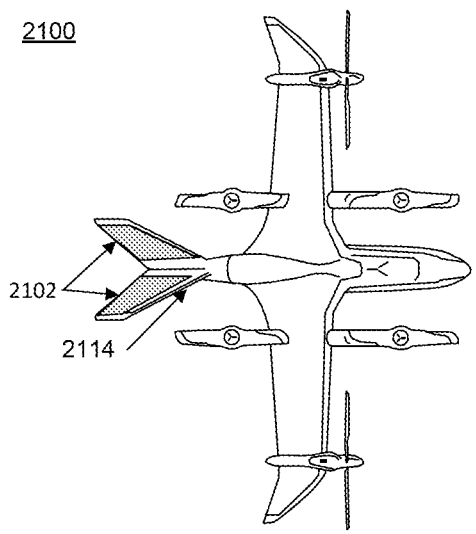
FIGS. 21A-21B illustrate a craft according to some embodiments of the present disclosure.
Figure 21B:
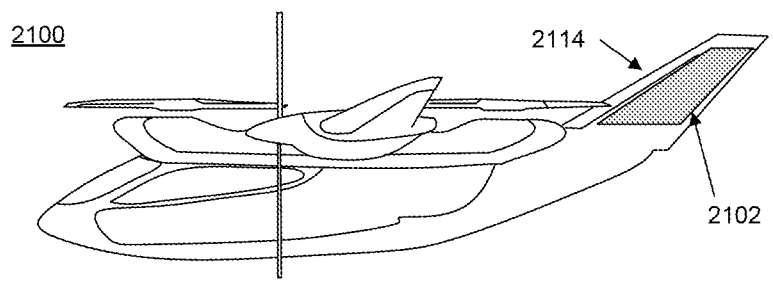

FIGS. 21A-21B illustrate a craft 2100 in a horizontal thrust configuration according to some embodiments of the present disclosure. Certain features of vertical take-off and/or landing craft 2100 are not shown or discussed in these examples where such features may be similar to those discussed for other embodiments. Tail 2114 may comprise one or more control surfaces. Tail 2114 may comprise two control surfaces 2102 configured to act as elevators and/or rudders on respective upward portions of tail 2114. Actuators for control surfaces 2102 may be in a tail. Control modes for the control surfaces may be operated mechanically or electronically.

Figure 22A:
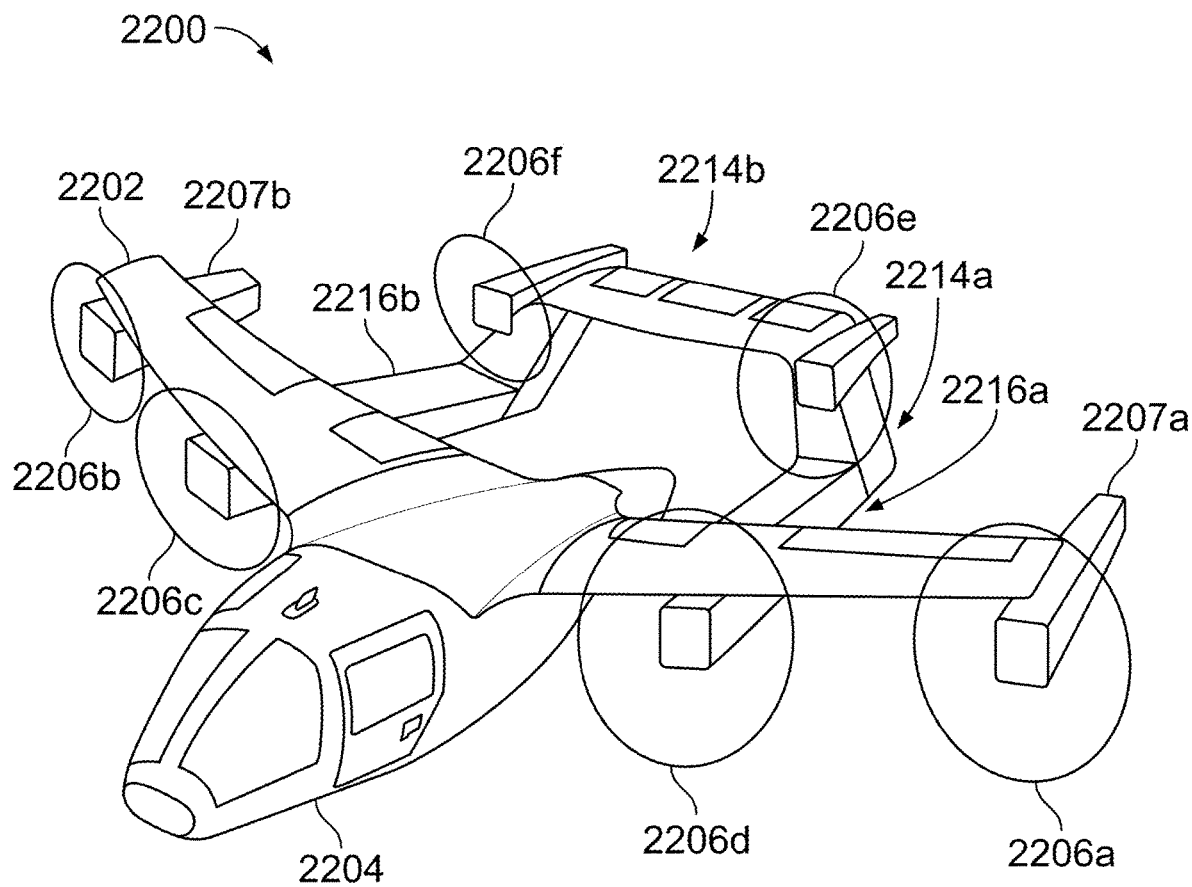
FIG. 22 illustrates a craft according to some embodiments of the present disclosure.
Figure 22B:
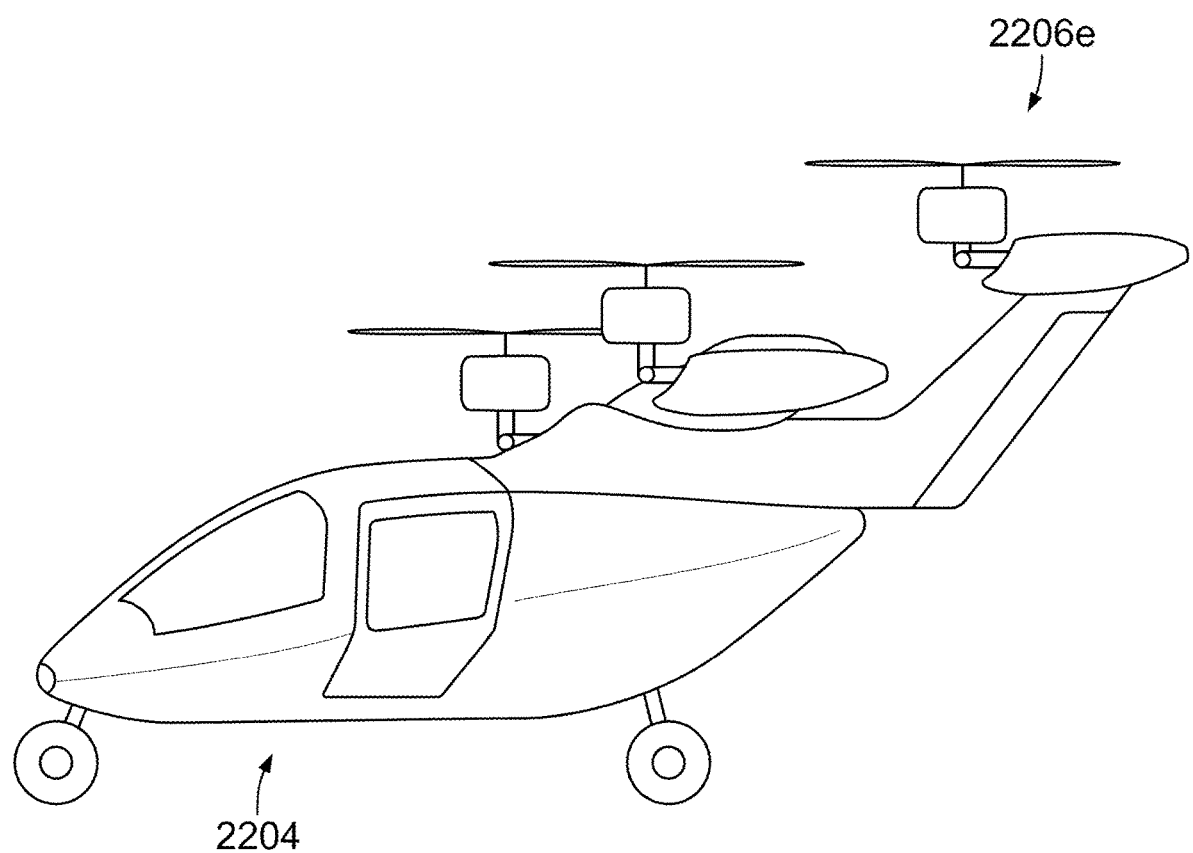

FIGS. 22A-22B illustrate a craft 2200 in an alternate configuration according to some embodiments of the present disclosure. Certain features of vertical take-off and/or landing craft 2200 are not shown or discussed in these examples where such features may be similar to those discussed for other embodiments. Craft 2200 may comprise a plurality of proprotors 2206a, 2206b, 2206c, 2206d, 2206e, 2206f. In some embodiments, proprotor 2206a is positioned at a first end of the lift surface 2208 and proprotor 2206b is positioned at a second end of the lift surface 2208. Craft 2200 may further comprise a tail 2214, tail 2214 including at least one vertical surface 2214a, and a horizontal surface 2214b. Further, in some embodiments, a first boom 2216a is attached to the lift surface 2208 and positioned between the body 2204 and the first proprotor 2206a, and a second boom 2216b is attached to the lift surface 2208 and positioned between the body 2204 and the second proprotor 2206b. The first boom 2216a and the second boom 2216b may be connected to the vertical surface 2214a of tail 2214 aft of the body 2204. Further, a third proprotor 2206c may be positioned at a front surface of the first boom 2216a, and a fourth proprotor 2206d may be positioned at a front surface of the second boom 2216b. A fifth proprotor 2206e and a sixth proprotor 2206f may be positioned on a first end and a second end of the horizontal surface 2214b, respectively, and positioned at a height above a top surface of the body 2204, as illustrated in FIG. 22B.

In some embodiments, the first proprotor 2206a, the second proprotor 2206b, the third proprotor 2206c, and the fourth proprotor 2206d may be rotatable with respect to the lift surface 2202. The fifth proprotor 2206e and the sixth proprotor 2206f may be rotatable with respect to the connecting surface 2240.

In some embodiments, the craft 2200 may include a cabin having a front portion and a rear portion, where the tail 2214 is disposed behind the rear portion of the cabin. In some embodiments, at least one of the plurality of proprotors of craft 2200 may be tilt rotors.

In some embodiments, the lift surface 2202 and the horizontal portion of the tail 2214b include a plurality of control surfaces.

In some embodiments, the first proprotor 2206a is positioned on a first hub 2207a and the second proprotor 2206b is positioned on a second hub 2207b. The first hub 2207a and the second hub 2207b may be configured to rotate about an axis substantially parallel to the lift surface 2202.

Figure 23:
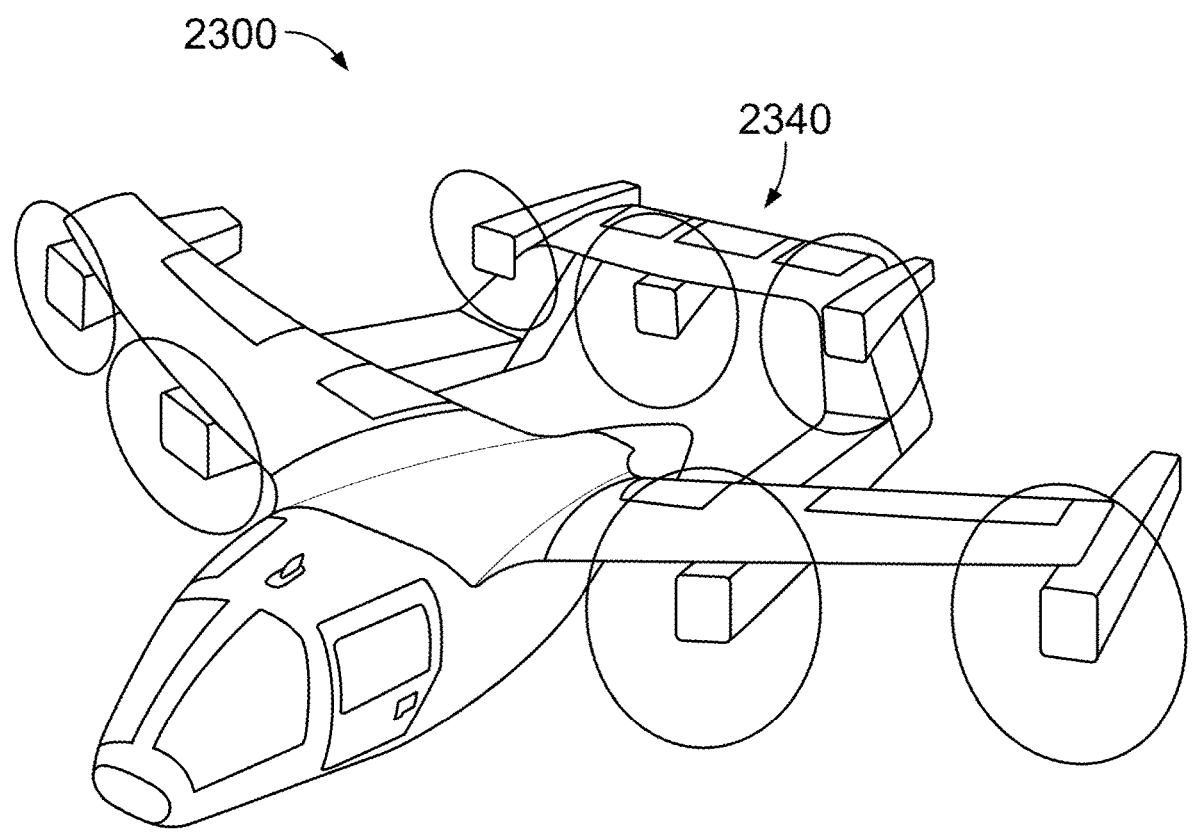
FIG. 23 illustrates a craft according to some embodiments of the present disclosure.

FIG. 23 illustrates a craft 2300 in an alternate configuration according to some embodiments of the present disclosure. Certain features of vertical take-off and/or landing craft 2300 are not shown or discussed in these examples where such features may be similar to those discussed for other embodiments. In some embodiments, a seventh proprotor 2306 is disposed between the fifth proprotor and the sixth proprotor. In some embodiments, the seventh proprotor 2306 is rotatable with respect to the connecting surface.

While the present disclosure has been described in connection with a plurality of exemplary aspects, as illustrated in the various figures and discussed above, it is understood that other similar aspects can be used for modifications and additions can be made to the described aspects for performing the same function of the present disclosure without deviating therefrom. For example, in various aspects of the disclosure, methods and compositions were described according to aspects of the presently disclosed subject matter. In particular, aspects of the present disclosure have been described as relating to systems and methods for providing a vertical take-off and/or landing craft. Additionally, other equivalent methods or composition to these described aspects are also contemplated by the teachings herein. Therefore, the present disclosure should not be limited to any single aspect, but rather construed in breadth and scope in accordance with the appended claims.

The invention claimed is:

1. A craft comprising:
a body;
a lift surface attached to the body;
a first proprotor positioned towards a first end of the lift surface;
a second proprotor positioned towards a second end of the lift surface;
a first boom positioned between the body and the first proprotor and attached to the lift surface;
a second boom positioned between the body and the second proprotor and attached to the lift surface;
wherein the first boom and the second boom are connected via a tail aft of the body, wherein the tail includes a connecting surface above the lift surface, and wherein the connecting surface is substantially horizontal;
a third proprotor positioned at a front surface of the first boom;
a fourth proprotor positioned at a front surface of the second boom;
a fifth proprotor positioned on a first end of the connecting surface; and
a sixth proprotor positioned on a second end of the connecting surface.

2. The craft of claim 1, wherein the first proprotor, second proprotor, third proprotor, and fourth proprotor are rotatable with respect to the lift surface.

3. The craft of claim 1, wherein the fifth proprotor and sixth proprotor are rotatable with respect to the connecting surface.

4. The craft of claim 1 further comprising a seventh proprotor positioned on the connecting surface.

5. The craft of claim 1, wherein the body comprises a cabin, the cabin having a front portion and a rear portion, and wherein the tail is disposed behind the rear portion of the cabin.

6. The craft of claim 1, wherein the fifth proprotor and the sixth proprotor are positioned at a height above a top surface of the body.

7. The craft of claim 1, wherein at least one of the first proprotor, the second proprotor, the third proprotor, the fourth proprotor, the fifth proprotor, and the sixth proprotor is a tilt rotor.

8. The craft of claim 1, wherein the lift surface comprises a wing.

9. The craft of claim 1, wherein the lift surface comprises a plurality of control surfaces.

10. A craft comprising:
a body;
a lift surface attached to the body;
a first proprotor and a first hub, wherein the first hub is attached to a first end of the lift surface and is configured to rotate about an axis substantially parallel to the lift surface;
a second proprotor and a second hub, wherein the second hub is attached to a second end of the lift surface and is configured to rotate about an axis substantially parallel to the lift surface;
a first boom positioned between the body and the first end of the lift surface, the first boom comprising a third proprotor;
a second boom positioned between the body and the second end of the lift surface, the second boom comprising a fourth proprotor; and
a tail extending upwards aft of the body, the tail comprising at least two rotors, wherein the at least two rotors are positioned at a height above a top surface of the body when the at least two rotors are in a horizontal thrust configuration.

11. The craft of claim 10, wherein the third proprotor and the fourth proprotor are rotatable with respect to the lift surface.

12. The craft of claim 10, wherein the at least two rotors are positioned on pylons disposed on the connecting surface.

13. A craft comprising:
a body;
a lift surface attached to the body;
a first proprotor positioned towards a first end of the lift surface;
a second proprotor positioned towards a second end of the lift surface;
a first boom positioned between the body and the first proprotor and attached to the lift surface;
a second boom positioned between the body and the second proprotor and attached to the lift surface;
wherein the first boom and the second boom are connected via a tail aft of the body, wherein the tail includes a connecting surface above the lift surface;
a third proprotor positioned at a front surface of the first boom;
a fourth proprotor positioned at a front surface of the second boom;
a fifth proprotor positioned on a pylon disposed on a first end of the connecting surface;
a sixth proprotor positioned on a pylon disposed on a second end of the connecting surface; and
a seventh proprotor positioned between the fifth proprotor and the sixth proprotor.

14. The craft of claim 13, wherein the first proprotor, second proprotor, third proprotor, and fourth proprotor are rotatable with respect to the lift surface.

15. The craft of claim 13, wherein the fifth proprotor, sixth proprotor, and seventh proprotor are rotatable with respect to the connecting surface.

16. The craft of claim 13, wherein the lift surface and the connecting surface each comprise a plurality of control surfaces.

\* \* \* \* \*